United States Patent
Shimada

(10) Patent No.: US 8,565,236 B2
(45) Date of Patent: Oct. 22, 2013

(54) RELAY APPARATUS FOR COMMUNICATION FRAMES AND RELAY METHOD

(75) Inventor: Katsumi Shimada, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 280 days.

(21) Appl. No.: 13/039,622

(22) Filed: Mar. 3, 2011

(65) Prior Publication Data

US 2012/0008491 A1  Jan. 12, 2012

(30) Foreign Application Priority Data

Jul. 8, 2010  (JP) ................................ 2010-155778

(51) Int. Cl.
  *H04B 3/34*  (2006.01)
(52) U.S. Cl.
  USPC ............ 370/392; 370/389; 370/229; 370/230
(58) Field of Classification Search
  USPC .............. 370/216, 242, 241, 241.1, 249, 252, 370/246, 218, 228, 225, 251, 250, 229, 230, 370/235, 236.2, 395.2, 395.53, 395.5, 389, 370/392, 401
  See application file for complete search history.

(56) References Cited

U.S. PATENT DOCUMENTS

| | | | |
|---|---|---|---|
| 8,155,520 B1 * | 4/2012 | West et al. ...................... 398/50 |
| 2008/0049621 A1 * | 2/2008 | McGuire et al. ........... 370/236.2 |
| 2008/0219268 A1 * | 9/2008 | Dennison ................... 370/395.2 |
| 2009/0059799 A1 * | 3/2009 | Friskney et al. ............ 370/241.1 |
| 2009/0073988 A1 * | 3/2009 | Ghodrat et al. .......... 370/395.53 |
| 2009/0168783 A1 * | 7/2009 | Mohan et al. ............... 370/395.5 |
| 2010/0039935 A1 * | 2/2010 | Davison et al. ................ 370/228 |
| 2010/0182902 A1 * | 7/2010 | Saltsidis ....................... 370/225 |
| 2010/0278048 A1 * | 11/2010 | Sawaguchi .................. 370/241.1 |

FOREIGN PATENT DOCUMENTS

| | | |
|---|---|---|
| JP | 2004-349881 | 12/2004 |
| JP | 2006-270169 | 10/2006 |

OTHER PUBLICATIONS

Office action dated Aug. 20, 2013 from corresponding Japanese Patent Application No. 2010-155778 and its English summary provided by the clients.

* cited by examiner

*Primary Examiner* — Abdullah Riyami
(74) *Attorney, Agent, or Firm* — Ladas & Parry, LLP

(57) ABSTRACT

A layer 2 switch (L2SW) includes (i) a learned information management unit for recording learned information that associates a receiving port, an address of another L2SW, and a source address specified in the original communication frame, when an encapsulated frame, in which a communication frame has been encapsulated by data containing the address of the another L2SW, is received from the backbone network and (ii) a status monitoring unit. The learned information management unit determines the update extent of the learned information, in accordance with a check result of the connection status and thus the occurrence of flooding transfer to a backbone networks side is suppressed.

5 Claims, 18 Drawing Sheets

| ENTRY ID | VLAN-ID | ORIGINAL MAC ADDRESS | PORT POSITION | MAC ADDRESS FOR ENCAPSULATION | AGING |
|---|---|---|---|---|---|
| 1 | 501 | a1 | 101 | — | 1 |
| 2 | 501 | c1 | 114 | d1 | 2 |
| ⋮ | ⋮ | ⋮ | ⋮ | ⋮ | ⋮ |

| ENTRY ID | VLAN-ID | ORIGINAL MAC ADDRESS | PORT POSITION | MAC ADDRESS FOR ENCAPSULATION | AGING |
|---|---|---|---|---|---|
| 1 | 501 | c1 | 109 | — | 0 |
| ⋮ | ⋮ | ⋮ | ⋮ | ⋮ | ⋮ |

| DESTINATION MAC ADDRESS | SOURCE MAC ADDRESS | VLAN TAG | PAYLOAD | FCS |
|---|---|---|---|---|

FIG.10A

| PORT | STATUS |
|---|---|
| 108 | BLOCK |
| 109 | FORWARDING |
| 110 | FORWARDING |
| ⋮ | ⋮ |

FIG.10B

| PORT | ATTRIBUTE |
|---|---|
| 108 | ON A BACKBONE SIDE |
| 109 | ORDINARY SIDE |
| 110 | ON A BACKBONE SIDE |
| ⋮ | ⋮ |

FIG.10C

| VLAN-ID | ASSIGNED PORT |
|---|---|
| 501 | 108, 109, 110 |
| ⋮ | ⋮ |

FIG.10D

| I-TAG | S-VID |
|---|---|
| 1001 | 501 |
| ⋮ | ⋮ |

FIG.12A

| PORT | ATTRIBUTE |
|---|---|
| 108 | ON A BACKBONE SIDE |
| 109 | ORDINARY SIDE |
| 110 | ON A BACKBONE SIDE |
| ⋮ | ⋮ |

FIG.12B

| S-VID | B-VID | I-TAG |
|---|---|---|
| 501 | 2001 | 1001 |
| ⋮ | ⋮ | ⋮ |

FIG.12C

| PORT | STATUS |
|---|---|
| 108 | BLOCK |
| 109 | FORWARDING |
| 110 | FORWARDING |

| MEP-ID | MAC ADDRESS | RECEIVING PORT POSITION | RECEIVING STATUS | NON-RECEIVING PERIOD |
|---|---|---|---|---|
| 3 | L2SW13 | 102 | NORMAL | 0 |
| 4 | L2SW14 | 113 | NORMAL | 200ms |
| 5 | L2SW15 | 113 | NORMAL | 100ms |
| ⋮ | ⋮ | ⋮ | ⋮ | ⋮ |

| B-VID | MEP ASSIGNMENT | MEP-ID |
|---|---|---|
| 2001 | YES | 1 |
| 2002 | NO | — |
| ⋮ | ⋮ | ⋮ |

RELAY APPARATUS FOR COMMUNICATION FRAMES AND RELAY METHOD

CROSS-REFERENCE TO RELATED APPLICATIONS

This application claims priority to Japanese Patent Application No. 2010-155778 filed on Jul. 8, 2010 the disclosures of which is incorporated herein by reference.

BACKGROUND OF THE INVENTION

1. Field of the Invention

The present invention relates to a data processing technology and, in particular, to a relay apparatus for relaying communication frames and a relay method for relaying the communication frames to the relay apparatus.

2. Description of the Related Art

One of the services provided by telecommunications carriers is Layer 2 Virtual Private Network (L2VPN) service in which multipoint connections are made between local area networks (LANs) of geographically separate sites, such as the head office and branch offices of an enterprise. This L2VPN is also called a wide-area Ethernet (Ethernet being a registered trademark). A communication network (hereinafter referred to as a "carrier network" also) of a telecommunications carrier providing L2VPN service comprises a group of relaying devices called provider bridges. A provider bridge, which is typically a Layer 2 switch (hereinafter referred to as "L2SW" also), transmits Ethernet frames sent from a customer device directly within the carrier network. As a result, a network service, which is less expensive per bandwidth, can be realized making the most of the broadband and low-cost features of Ethernet.

Upon receiving an Ethernet frame, the L2SW learns a correspondence between a source MAC address and a receiving port of the Ethernet frame and stores the correspondence therewithin. This information will hereinafter be referred to as "learned information" also. Further, the L2SW checks to see if the destination MAC address in the received Ethernet frame has already been learned or not, and if it has already been learned, outputs the Ethernet frame to the communication port which is associated with the destination MAC address. If, on the other hand, the destination MAC address has not yet been learned, then the L2SW transfers the Ethernet frame to all the communication ports but the one which has received the Ethernet frame (this function hereinafter referred to as "flooding" also). Thus, even in a multipoint connection, unnecessary flooding can be avoided by the use of learned information, and a bandwidth can be used effectively by transferring the Ethernet frame to the necessary communication port only.

RELATED ART LIST (1) Japanese Unexamined Patent Application Publication No. 2004-349881.

There is a known method for improving the reliability of a communication network by providing it with redundant paths as in ring topology. In this method, specific ports of the L2SW in a communication network are set to a block state to interrupt the relay of communication frames, thereby preventing the looping of frames. As a result, a communication path for transmitting Ethernet frames between any given L2SWs is selected uniquely. The setting of this block state may be sometimes done by maintenance personnel who manually push in and pull out the cable. Also, with equipment provided with a protocol processing function such as spanning tree protocol, a spanning tree may be formed by setting specific ports to block state automatically by exchanging predetermined messages between the L2SWs.

When there is any change in the availability of frame relay at a communication port, the conventional method has been such that the learned information within the L2SW was erased uniformly. As a result, flooding of the communication frame by the L2SW occurred and tended to compress the bandwidths of the communication network.

SUMMARY OF THE INVENTION

The present invention has been made in view of these problems to be solved, and a main purpose thereof is to provide a technology for reducing the occurrence of flooding even when there is a change in the communication environment.

In order to resolve the above-described problems, a relay apparatus, for relaying communication frames, according to one embodiment of the present invention comprises: a plurality of communication ports; a frame transmitter configured to transmit an encapsulated frame to a network, the encapsulated frame being generated such that a communication frame received from outside is encapsulated by data containing an address of the relay apparatus; a learned information management unit configured to record learned information that associates a receiving port, an address of another relay apparatus, and a source address specified in a communication frame before encapsulation, when the encapsulated frame, which is encapsulated by data containing the address of the another relay apparatus, is received from the network; and a status monitoring unit configured to check connection status for the another relay apparatus. When the source address specified in the communication frame matches a source address of the learned information, the frame transmitter transmits the encapsulated frame of the communication frame from the receiving port of the learned information to the network without causing flooding in the plurality of communication ports; and the learned information management unit determines an update extent of the learned information, in accordance with a check result of the connection status.

Another embodiment of the present invention relates to a relay method for relaying communication frames. The relay method is a method executed by a relay apparatus having a plurality of communication ports, and the relay method comprises: transmitting an encapsulated frame to a network, the encapsulated frame being generated such that a communication frame received from outside is encapsulated by data containing an address of the relay apparatus; recording learned information that associates a receiving port, an address of another relay apparatus, and a source address specified in a communication frame before encapsulation, when the encapsulated frame, which is encapsulated by data containing the address of the another relay apparatus, is received from the network; and checking connection status for the another relay apparatus. When the source address specified in the communication frame matches a source address of the learned information, said transmitting transmits the encapsulated frame of the communication frame from the receiving port of the learned information to the network without causing flooding in the plurality of communication ports; and said recording determines an update extent of the learned information, in accordance with a check result of the connection status.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 10A shows a structure of a port attribute table;

FIG. 10B shows a structure of a port attribute table;

FIG. 10C shows a structure of a port assignment status table;

FIG. 10D is a structure of a VLAN lookup table;

FIG. 12A shows a structure of a port attribute table;

FIG. 12B shows a structure of a VLAN lookup table;

FIG. 12C shows a structure of a port setting table;

DETAILED DESCRIPTION OF THE INVENTION

Figure 1:
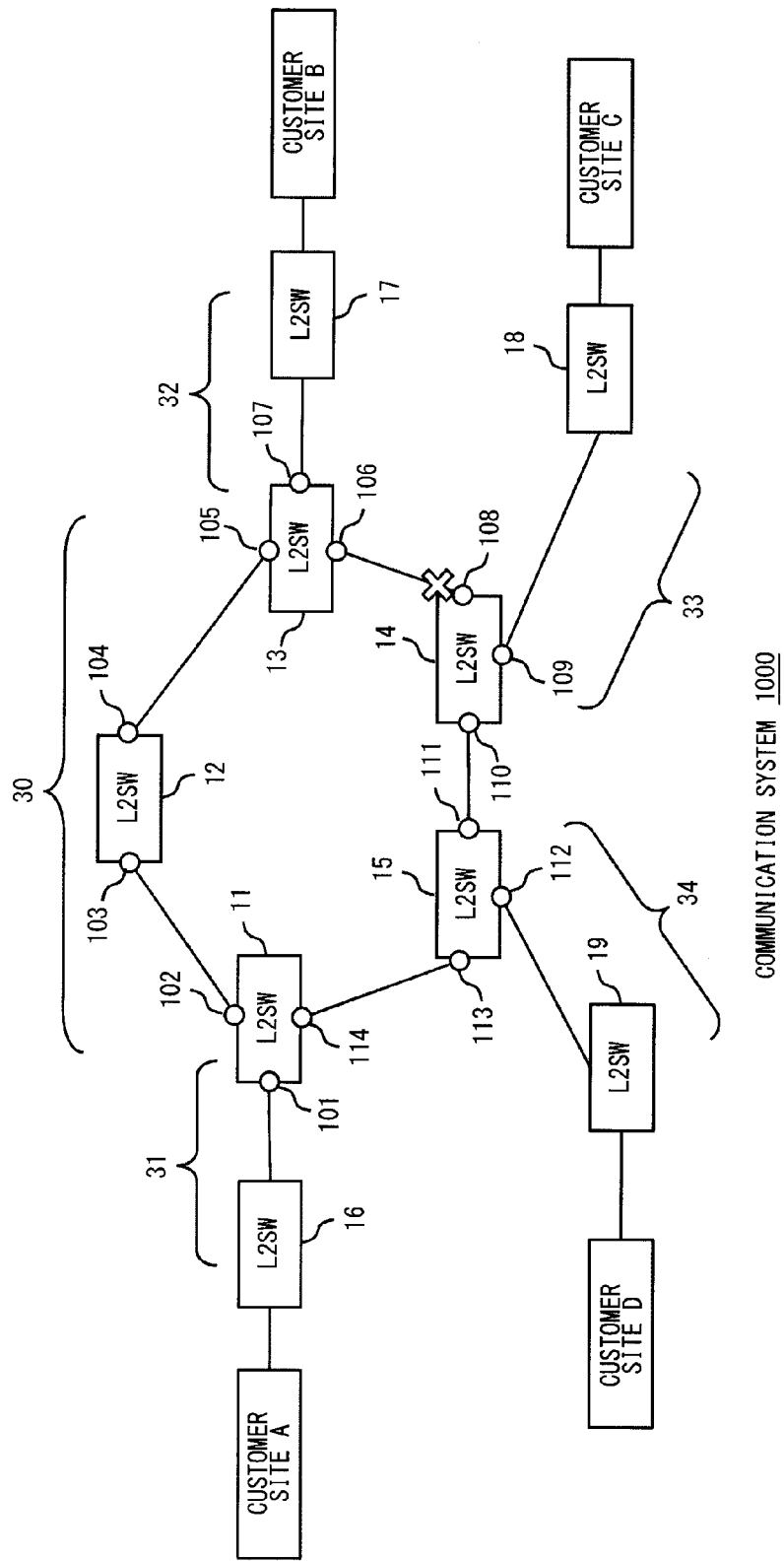
FIG. 1 shows a structure of a communication system employing a MAC-in-MAC scheme.

The invention will now be described by reference to the preferred embodiments. This does not intend to limit the scope of the present invention, but to exemplify the invention.

The present invention will first be outlined before a detailed description is given of preferred embodiments thereof.

A relay apparatus for relaying communication frames (L2SW: layer 2 switch), as proposed herein, is installed in a backbone network which relays communication frames using an encapsulation technology called a MAC-in-MAC scheme. It is known that the MAC-in-MAC scheme is standardized as IEEE 802.1ah. Also, the L2SW in the preferred embodiments uses a continuity check message (hereinafter referred to as "CCM" also), which is an OAM (Operations, Administration and Maintenance) frame for checking the normalcy of connection in a given section of a communication network. The CCM is, for example, the Ethernet OAM (hereinafter referred to as "ETH-OAM" also) standardized by ITU-T Recommendation Y. 1731 or IEEE 802.1ag.

A plurality of L2SWs installed in a backbone network check the normalcy of a connection by exchanging the CCM frames periodically. The CCM frames transmitted and received by the L2SWs are Ethernet frames that are not encapsulated, and a MAC address of a source L2SW is set in the source MAC address thereof and a multicast address is set in the destination MAC address thereof. An L2SW monitors the status of connection with the other L2SWs through management of the receiving status of the CCM frames transmitted from the other L2SWs.

At the L2SW, when there is a change in the relay status of the communication ports, it becomes necessary to erase learned information to change the transmission path of communication frames. In such a case, the L2SW in the preferred embodiments checks to see if the CCM frames from the other L2SWs are being received continuously by the same communication ports. When a CCM frame is being received continuously by the same communication port, learned information associated with the transmitting L2SW is not erased. When there is no receiving of a CCM frame from one of the other L2SWs, learned information associated with the L2SW is erased. In other words, learned information stored within the L2SW is not erased uniformly, but learned information to be erased is selectively erased by determining the update extent of learned information according to the receiving status of CCM frames. In this manner, the occurrence of flooding is suppressed.

Moreover, when there is a change in the receiving port, the L2SW in the preferred embodiments rewrites the receiving port recorded in the learned information as the receiving port of the CCM frame after the change, even when the L2SW is continuously receiving the CCM frame from the same transmission source. Thus, when there is a change in the communication path between L2SWs, communication frames can be sent out from the communication port associated with the path after the change without the occurrence of a flooding even before the relearning of the path after the change.

Hereinbelow, first the MAC-in-MAC scheme and then the ETH-OAM will be explained as the basic technologies. After that, the erasure method of learned information in known art will be explained before a detailed description is given of the L2SW in the preferred embodiments.

A Description of the MAC-in-MAC Scheme

FIG. 1 shows a structure of a communication system 1000 employing a MAC-in-MAC scheme. A provider backbone bridge network (hereinafter referred to as "PBB network" also) 30 shown in FIG. 1 is a communication network where communication frames encapsulated by the MAC-in-MAC scheme are transferred. Contrary to this, provider bridge networks (hereinafter referred to as "PB networks" also) 31 to 34 are communication networks where communication frames not encapsulated are transferred. Hereinafter, communication frames before encapsulation are referred to as "original frames" also, and communication frames after encapsulation as "encapsulated frames" also. And a bridge (a relay apparatus for relaying communication frames) installed at the boundary of a PB network and a PBB network to connect them is referred to specifically as a "backbone edge bridge (BEB)" also. In FIG. 1, L2SW 11, L2SW 13, L2SW 14, and L2SW 15 are BEBs.

The communication system 1000 provides a service of multipoint connections between customer networks (customer sites A to D) structured at different locations, through the medium of the PBB network 30 and the PB networks 31 to 34. The PBB network 30 is constituted by L2SW 11, L2SW 12, L2SW 13, L2SW 14, and L2SW 15. The PBB network 30 is a communication network for transferring encapsulated frames, which are made by encapsulating original frames transmitted from the respective customer sites, via the PB networks 31 to 34. The L2SWs 11 to 15 are each provided with a plurality of communication ports. Hereinbelow, the communication ports are identified as ports N (N being a natural number). For example, the L2SW 11 is provided with port 101, port 102, and port 114.

The PBB network 30 of FIG. 1 is interconnected in a ring, thus providing a redundancy of communication paths. Therefore, in order to prevent the looping of communication frames, a logically tree-shaped topology is formed manually by maintenance personnel or automatically formed by a spanning tree (STP) or the like. Thus, each of the communication ports of the L2SWs 11 to 15 is set to an enabled state (hereinafter referred to as "forwarding state" also), where transfer of communication frames is permitted, or a disabled state (hereinafter referred to as "block state" also), where transfer of communication frames is not permitted.

The forwarding state is, in other words, a state in which the communication frame relaying function is enabled, and the block state is a state in which the communication frame relaying function is disabled. Hereinbelow, a communication port in a block state is called a "block point" also. In FIG. 1, port 108 of the L2SW 14 is in a block state (a block point). It is to be noted that since all the PB networks 31 to 34 are not of a redundant structure, the communication ports connected to the PB networks (example: port 101 of L2SW 11) are normally set to a forwarding state.

Figure 2A:
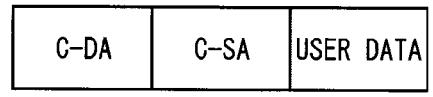
FIG. 2A schematically shows a communication frame in the communication system of FIG. 1.
Figure 2B:
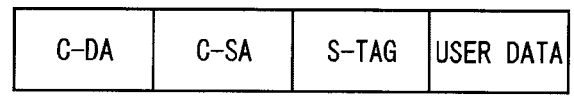
FIG. 2B schematically shows a communication frame in the communication system of FIG. 1.
Figure 2C:
FIG. 2C schematically shows a communication frame in the communication system of FIG. 1.

FIG. 2A, FIG. 2B, and FIG. 2C show schematically the communication frames relayed by the communication system 1000 of FIG. 1. FIG. 2A shows an Ethernet frame that is transmitted between customer site A and L2SW 16, between customer site B and L2SW 17, between customer site C and L2SW 18, and between customer site D and L2SW 19. "C-DA" is the destination MAC address that identifies the communication device at the destination customer site. "C-SA" is the source MAC address that identifies the communication device at the source customer site. "User Data" is the content itself (payload) of data to be sent and received between the communication devices of the customer sites.

FIG. 2B shows an Ethernet frame that is transmitted between L2SW 16 and L2SW 11 (PB network 31), between L2SW 17 and L2SW 13 (PB network 32), between L2SW 18 and L2SW 14 (PB network 33), and between L2SW 19 and L2SW 15 (PB network 34). The L2SWs 16, 17, 18 and 19 add an "S-TAG (service tag)" to the Ethernet frame of FIG. 2A and send the communication frame to the respective PB networks. The "S-TAG" is a VLAN tag by which the PB network identifies a user. It should be appreciated that the Ethernet frames of FIG. 2A and FIG. 2B are both original frames which are not encapsulated.

FIG. 2C shows an Ethernet frame that is transmitted within the PBB network 30. The L2SWs 11, 13, 14 and 15, which are BEBs installed at the entrances to the PBB network 30, send encapsulated frames, in which user identification information (I-TAG) and relay control information (B-DA (backbone destination address), B-SA (backbone source address), B-TAG (backbone tag)) are added to the original frame of FIG. 2B, to the PBB network 30.

The "B-TAG" is a VLAN tag added to identify a VLAN group within the PBB network 30. As for the "I-TAG", a value corresponding to the value of S-TAG is set, and the correspondence is stored in advance in the BEBs. The "B-DA" is a MAC address of a BEB installed at an exit within the PBB network 30 or a multicast address for flooding within a VLAN corresponding to a B-TAG in the PBB network 30. The "B-SA" is a MAC address of a BEB, which is a generator of encapsulated frames, that is, a MAC address of a BEB installed at an entrance within the PBB network 30.

In the PBB network 30, relay of encapsulated frames is performed by referring to relay control information (B-DA, B-SA, B-TAG) only. By the application of the MAC-in-MAC scheme, a backbone core bridge (hereinafter referred to as "BCB" also), which performs only relaying within the PBB network 30, has to learn the MAC address of the BEB only. Thus, even when a large number of customer communication devices are interconnected by a large-scale L2VPN, the amount of information to be learned can be reduced. This will also avoid flooding, which occurs when information learned overflows, and shorten the time of search for information to be learned. It should be appreciated that the encapsulated frames based on the MAC-in-MAC scheme have backwards compatibility. Therefore, the conventional L2SW can also be used as a BCB. Note that the L2SW 12 in FIG. 1 is a BCB.

The BEB at an exit of the PBB network 30 deletes the B-DA, B-SA, B-TAG, I-TAG and adds an S-TAG to be determined by the I-TAG before transferring the frame to the PB network. In so doing, the BEB records as learned information the correspondence between the source MAC address (C-SA) in the original frame and the source address (B-SA) in the encapsulated frame. This learned information is used in determining the destination address (B-DA) of an encapsulated frame corresponding to the destination address (C-DA) of an original frame when the original frame to be transferred in the opposite direction is encapsulated.

Referring back to FIG. 1, the PB networks 31 to 34 are communication networks for accommodating customer sites A to D, respectively. It is assumed here that these PB networks constitute a VLAN group, identified by VLAN-ID=501, to transfer data of a specific client company X. Hereinafter, the VLAN-ID at the PB networks is referred to as "S-VID" also.

When encapsulating an original frame, having data of S-VID=501 set to the S-TAG, and sending the encapsulated frame into the PBB network 30, the BEB of the PBB network 30 transfers this original frame as a VLAN group identified by VLAN-ID=2001. Hereinafter, the VLAN-ID at the PBB network 30 is referred to as "B-VID" also. In other words, the communication frames of company X which are transferred between the PB networks 31 to 34 are transferred by a VLAN of VLAN-ID=2001 as encapsulated frames having data of B-VID=2001 set to the B-TAG.

Figure 3:
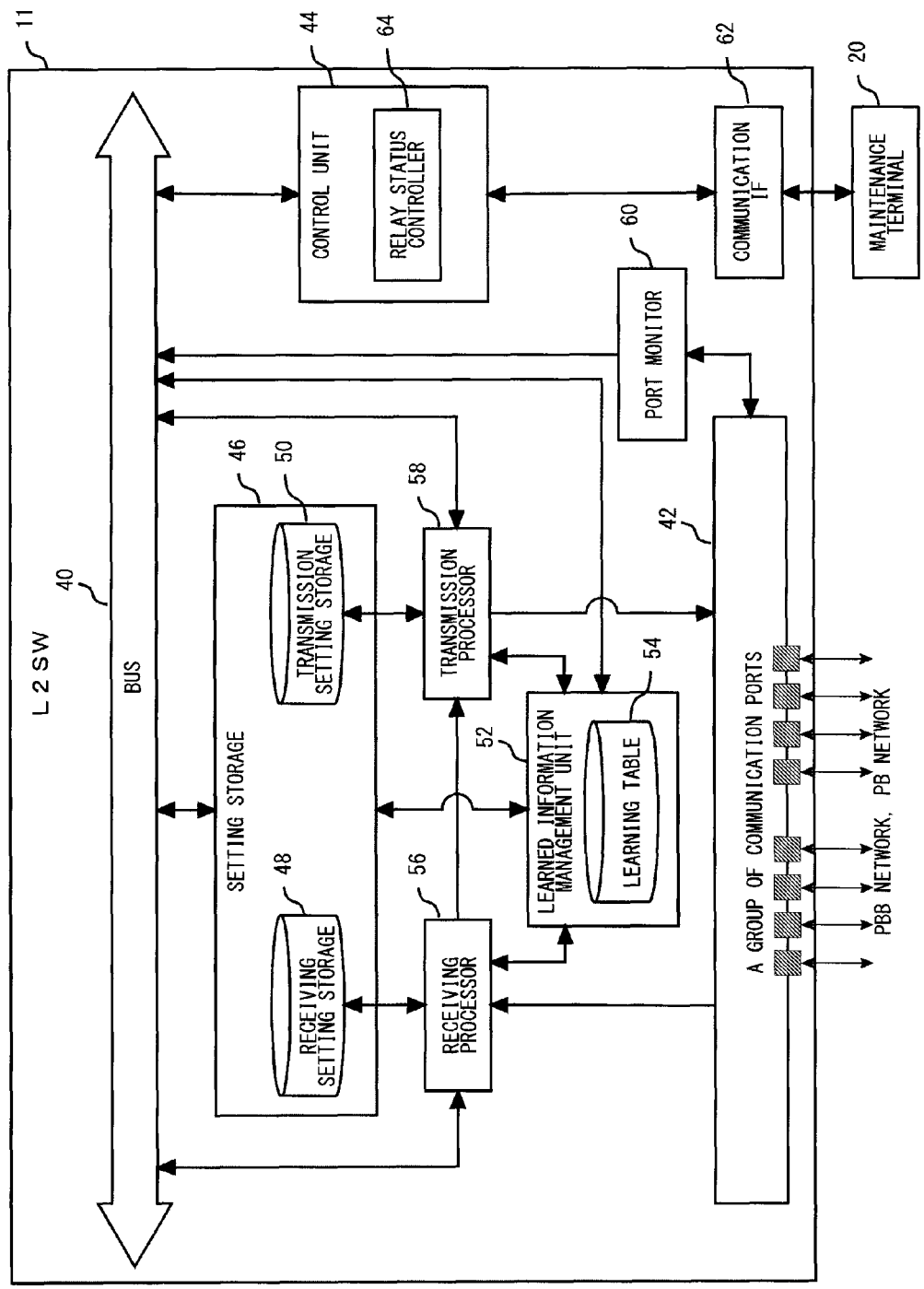
FIG. 3 is a block diagram showing a functional configuration of an L2SW of FIG. 1.

FIG. 3 is a block diagram showing a functional configuration of an L2SW of FIG. 1. Note that each of the L2SWs of FIG. 1 can be functionally implemented by the same configuration. Therefore, the configuration of the L2SW 11 only will be explained, with the description of the other L2SWs omitted. The L2SW 11 includes a bus 40, a group of communication ports 42, a control unit 44, a setting storage 46, a learned information management unit 52, a receiving processor 56, a transmission processor 58, a port monitor 60, and a communication IF 62. The control unit 44 includes a relay status controller 64. The setting storage 46 includes a receiving setting storage 48 and a transmission setting storage 50. The learned information management unit 52 includes a learning table 54.

The functional blocks shown in block diagrams herein can each be implemented using hardware by a CPU or memory of a computer, a device or electronic circuit, such as an HDD, or a mechanical system, and using software by a computer program or the like. The functional blocks therein are also depicted as ones that are realized by their cooperation. Therefore, it should be understood by those skilled in the art that these functional blocks can be realized in a variety of forms such as by hardware only, software only, or the combination thereof.

The bus 40 is a bus for transfer of data between the control unit 44, the setting storage 46, the learned information management unit 52, the receiving processor 56, the transmission processor 58, and the port monitor 60. Also, the group of communication ports 42, comprised of a plurality of communication ports, are port 101, port 102, and port 114 for the L2SW 11.

The control unit 44 controls the operation of the L2SW 11 as a whole. The control unit 44 may include a CPU (not shown) for executing various processings according to programs and a memory (not shown) for storing the programs to be executed by the CPU and data to be used by the programs. The relay status controller 64 enables or disables the communication frame relaying (transfer) function at each of the communication ports. In other words, the relay status controller 64 sets or removes, as appropriate, the block point, which interrupts the relay of communication frames, at each of the communication ports. More specifically, the relay status controller 64 sets a forwarding state or a block state, as the relay status of each of the communication ports, in a table (port setting table to be described later) stored in the receiving setting storage 48 and the transmission setting storage 50.

The communication IF 62 executes processings of communication with a maintenance terminal 20 which is used by a manager (maintenance personnel). More specifically, the communication IF 62 receives a command sent from the maintenance terminal 20 and conveys the received command to the control unit 44. Also, the communication IF 62 acquires the result of execution of the command sent from the maintenance terminal 20 and transmits the received result thereof to the maintenance terminal 20.

The setting storage 46 is a storage means for storing various items of setting information. The receiving setting storage 48 retains information that is referenced by the receiving processor 56, whereas the transmission setting storage 50 retains information that is referenced by the transmission processor 58. Specific storage data to be stored by the receiving setting storage 48 and the transmission setting storage 50 will be described later.

The learned information manager 52 records in the learning table 54 learned information which is the VLAN-ID and source address (C-SA) of Ethernet frames received in the past associated with the identification information on the communication port having received the frames (hereinafter referred to as "receiving port" also). Hereinafter, a record of learned information is referred to as an "entry" also. The learned information management unit 52, when it has received an encapsulated frame to be transferred from the PBB network 30 to the PB network 31, has the source MAC address (B-SA) of the BEB contained in the entry. Also, the learned information management unit 52 has an aging function by which a certain entry, when a predetermined period of time has passed without the relearning of the entry, is erased as old information.

Figures 4A, 4B, 5A, 5B:
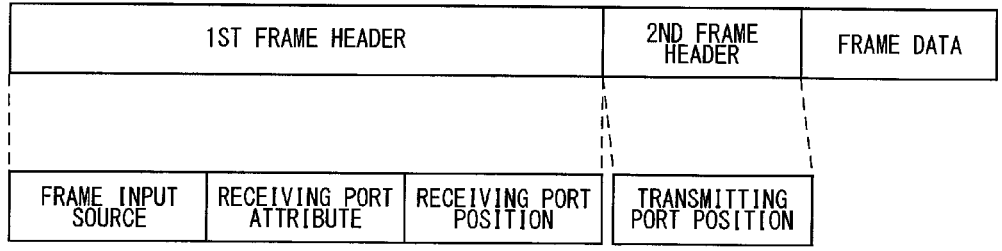
FIG. 4A shows a structure of learned information.
FIG. 4B shows a structure of learned information.
FIG. 5A shows a structure of Ethernet frame.
FIG. 5B shows a structure of an intra-device frame.

FIGS. 4A and 4B each illustrates a structure of learned information. For example, when the L2SW 16 of FIG. 1 transmits an original frame with VLAN-ID=501 and C-SA=a1 to the L2SW 11, the L2SW 11 receives the original frame at port 101. "a1" is the MAC address of the communication device at the communication site A. In this case, the learned information management unit 52 records the learned information on entry ID "1" of FIG. 4A.

Also, when the L2SW 16 of FIG. 1 transmits an original frame with VLAN-ID=501 and C-SA=c1 to the L2SW 14, the L2SW 14 receives the encapsulated frame at port 109. "c1" is the MAC address of the communication device at the communication site C. The L2SW 14 transfers the encapsulated frame of the original frame to the PBB network 30, and the L2SW 11 receives the encapsulated frame at port 114. In this case, the learned information management unit 52 records the learned information on entry ID "2" of FIG. 4A. "d1" is the MAC address of the L2SW 14.

Also, the learned information in the learning table differs for each L2SW, and the learned information as shown in FIG. 4B is recorded in the above-exemplified L2SW 14.

When the learned information management unit 52 receives the original frame or encapsulated frame and learns it, the learned information management unit 52 updates the aging value to "0" irrespective of whether the frame is new or one received in the past (one which has already been learned in the past). On the other hand, the leaned information management unit 52 searches the learning table in sequence, at a constant frequency (e.g., every time five seconds has elapsed), and adds "1" to each entry which has already been learned. If the aging value exceeds a predetermined value as a result of this addition, the applicable entry will be deleted. If, for example, the aging time is 30 seconds, the entry will be deleted when the aging value of entry reaches has reached "6". In this manner, the old learned information, which is not updated within a certain period of time, is automatically deleted, so that the leaning table is used efficiently.

Now, refer back to FIG. 3. As the receiving processor 56 and the transmission processor 58 receive a communication frame from the group of communication ports 42 and/or the bus 40, they determine the transfer destination of the communication frame according to the type of the communication frame and the learned information of the learning table 54 and then sends the communication frame to the group of communication ports 42 and/or the bus 40.

The port monitor 60 monitors the connection status between the own device and a device on the opposite side (hereinafter referred to as "opposite device" also), about each communication port of the group of communication ports 42. That is, the port monitor 60 monitors whether the own device is able to communicate with the device on the opposite side or not.

With reference to FIGS. 5A and 5B, a description is given here of a structure of a communication frame transferred by the communication system 1000. FIG. 5A shows a structure of an Ethernet frame. A destination MAC address shown in FIG. 5A is an address used to uniquely identify a communication interface of a destination device and the own device. There are two types of destination MAC address; one is unicast address and the other is multicast address. The unicast address is an address in which the least significant bit of a leading octet is "0", the unicast address specifying a specific device and interface. The multicast address is an address in which the least significant bit of the leading octet is "1", and is used to specify mainly a control frame, such as an OAM frame, and a plurality of destinations at one time and all together.

An L2SW (the L2SW 11, for example) receives a control frame (e.g., CCM frame) whose destination address is a multicast address, and transfers the control frame to all ports belonging to the same VLAN if this control frame does not terminate in the own device (that is, the own device is not the ultimate destination). In other words, the control frame is subjected to flooding. A source MAC address shown in FIG. 5A is an address used to uniquely identify a communication interface of a source device and the own device. A VLAN tag is a unique identification information assigned to each logical network when a single network is divided into a plurality of logical networks and operated.

Payload is a data body being transmitted and received, and is, for example, an IP (Internet protocol) datagram divided into a predetermined data length. FCS (frame check sequence) is a value used to detect error in the received frames. The Ethernet frame shown in FIG. 5A is transmitted and received between each L2SW or between an L2SW and a user terminal. There are cases where the VLAN tag is omitted and where not-shown other header information is added. The Ethernet frame of FIG. 2A is one shown in FIG. 5A with the VLAN tag removed. In the Ethernet frame of FIG. 2B, S-TAG corresponds to the VLAN tag of FIG. 5A. In the Ethernet frame of FIG. 2C, "B-DA", "B-SA", "B-TAG" and "I-TAG" and fields subsequent to I-TAG" correspond respectively to destination MAC address, source MAC address, VLAN tag, and payload.

FIG. 5B shows an intra-device frame in which an intra-device frame header is added to the Ethernet frame, when the Ethernet frame is to be transferred within a device. Data of FIG. 5A is stored in a frame data of FIG. 5B. As shown in FIG. 5B, a first frame header stores a frame input source, a receiving port attribute, and a receiving port position, whereas a second frame header stores a transmitting port position. The "frame input source" indicates whether the input source of the Ethernet frame is the group of communication ports 42 (fame input source=0) or the bus 40 (frame input source=1).

The "receiving port attribute" indicates whether the receiving port of the Ethernet frame is on a backbone side or an ordinary side. Here, the backbone side means that the receiving port is connected to the PBB network 30, and also the receiving port attribute is set to "0". The ordinary side means that the receiving port is connected to networks, other than PBB network 30, which are the PB networks 31 to 34, for instance, or customer sites, and also the receiving port attribute is set to "1". Identification information on a communication port that has received the Ethernet frame is stored in the "receiving port position", and identification information on a communication port which is to transmit the Ethernet frame is stored in the "transmitting port position".

The receiving processor 56 and the transmission processor 58 perform a relay processing of a communication frame by updating and referencing the first frame header and the second frame header. More specifically, (i) the input source of the communication frame is determined, (ii) a communication port from which the frame is to be transmitted is determined, (iii) an encapsulated frame is set by encapsulating an original frame, and (iv) the original frame is extracted by decapsulating the encapsulated frame.

A description is now given of an EtherType value and an OpeCode contained in the payload. The receiving processor 56 and the transmission processor 58 determine the type of Ethernet frame by referencing the EtherType value and the OpeCode. More specifically, if the EtherType value is "0x9B10" and the OpeCOde is "1", the type of Ethernet frame will be determined as a continuity check message (CCM). If the EtherType value is other than "0x9B10", it will be determined as a normal frame which is not the CCM frame.

Figure 6:
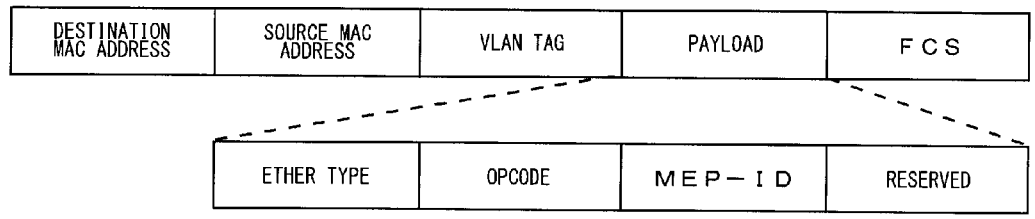
FIG. 6 shows a structure of CCM frame.

FIG. 6 shows a format of CCM frame. Referring to FIG. 6, MEP-ID (multiple entry point ID) and a reserved area, which are assigned subsequent to OpeCode, are contained in the payload of CCM frame.

An operation of an L2SW configured as above will now be described hereunder. A description is given hereunder of an example where an original frame of C-SA=c1 is sent out from the customer site C of FIG. 1 and the frame is transferred to the PB networks 33, 32 and 31 and the PB network 30 and finally to the customer site A. Assume herein that this frame is transferred within the PB network 33 with VLAN-ID=501 and also assume that the C-DA of a first frame is such that all of 6 bytes are a broadcast address of FF. Though the function, performed by the L2SW 18, for receiving this frame and transferring it in the PB network 33 is a known function performed by the L2SW and thus the description thereof is omitted here, the functions of L2SW other than the BEBs are also included in the structure and processing flowcharts of the BEBs, such as the L2SW 14.

Figure 7:
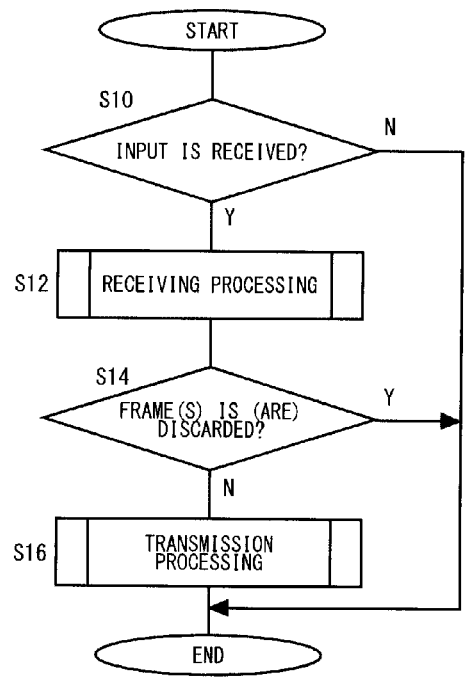
FIG. 7 is a flowchart showing an operation of an L2SW shown in FIG. 1.

FIG. 7 is a flowchart showing an operation of an L2SW shown in FIG. 1. As the receiving processor 56 receives an input from outside (Y of S10), the receiving processor 56 carries out a receiving processing described later (S12). The typical inputs from outside are the input of communication frames received at the group of communication ports 42 in the L2SW and the input of instruction data from the control unit 44 via the bus 40. If the communication frames are not discarded in the receiving processing of Step S12 (N of S14), the transmission processor 58 will carry out a transmission processing described later (S16). If the communication frames are discarded (Y of S14), Step S16 will be skipped. If no input information is received from outside (N of S10), the subsequent processes will be skipped and the flow of FIG. 7 will be terminated.

Figure 8:
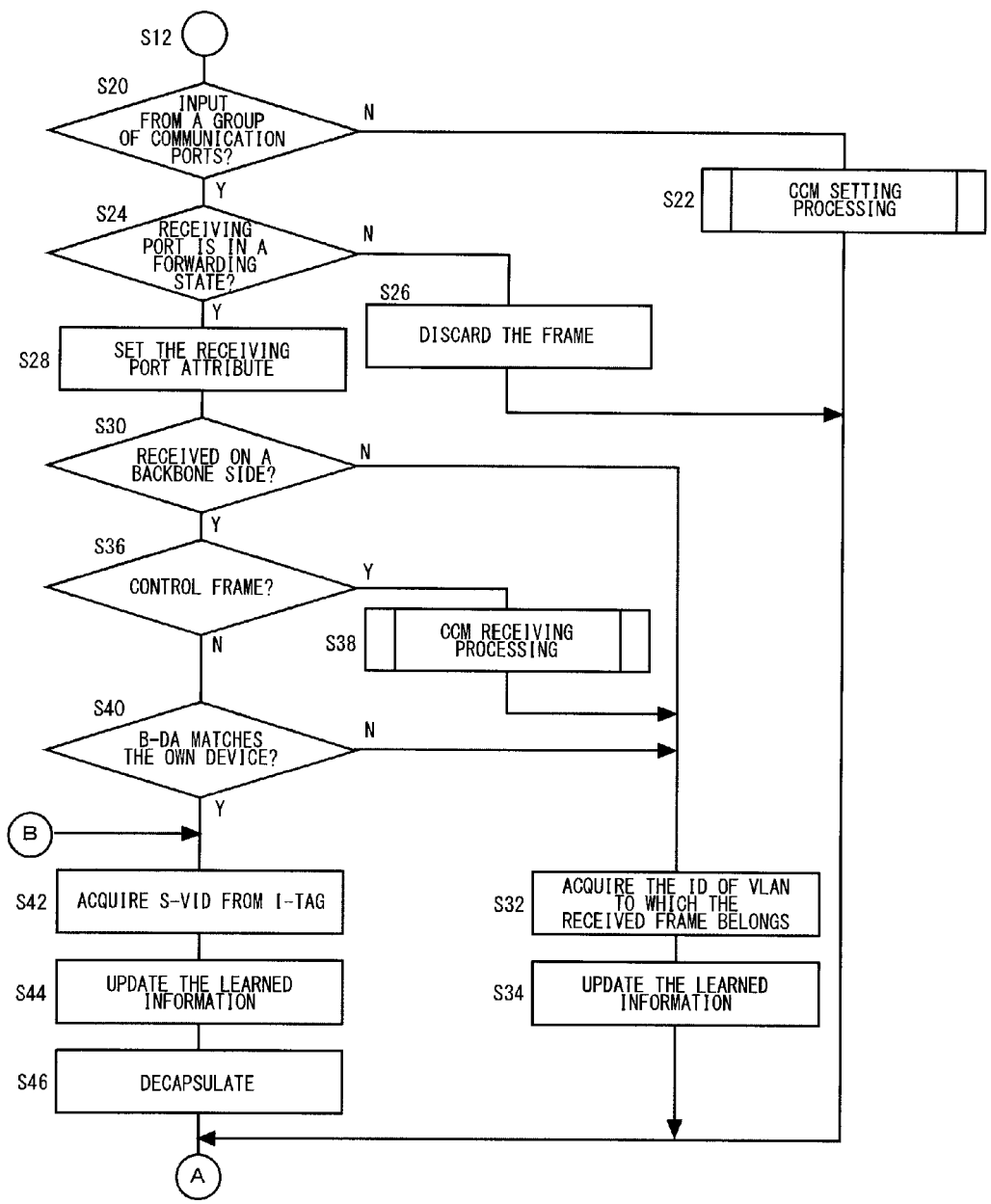
FIG. 8 is a flowchart showing a detailed receiving processing of S12 of FIG. 7.
Figure 9:
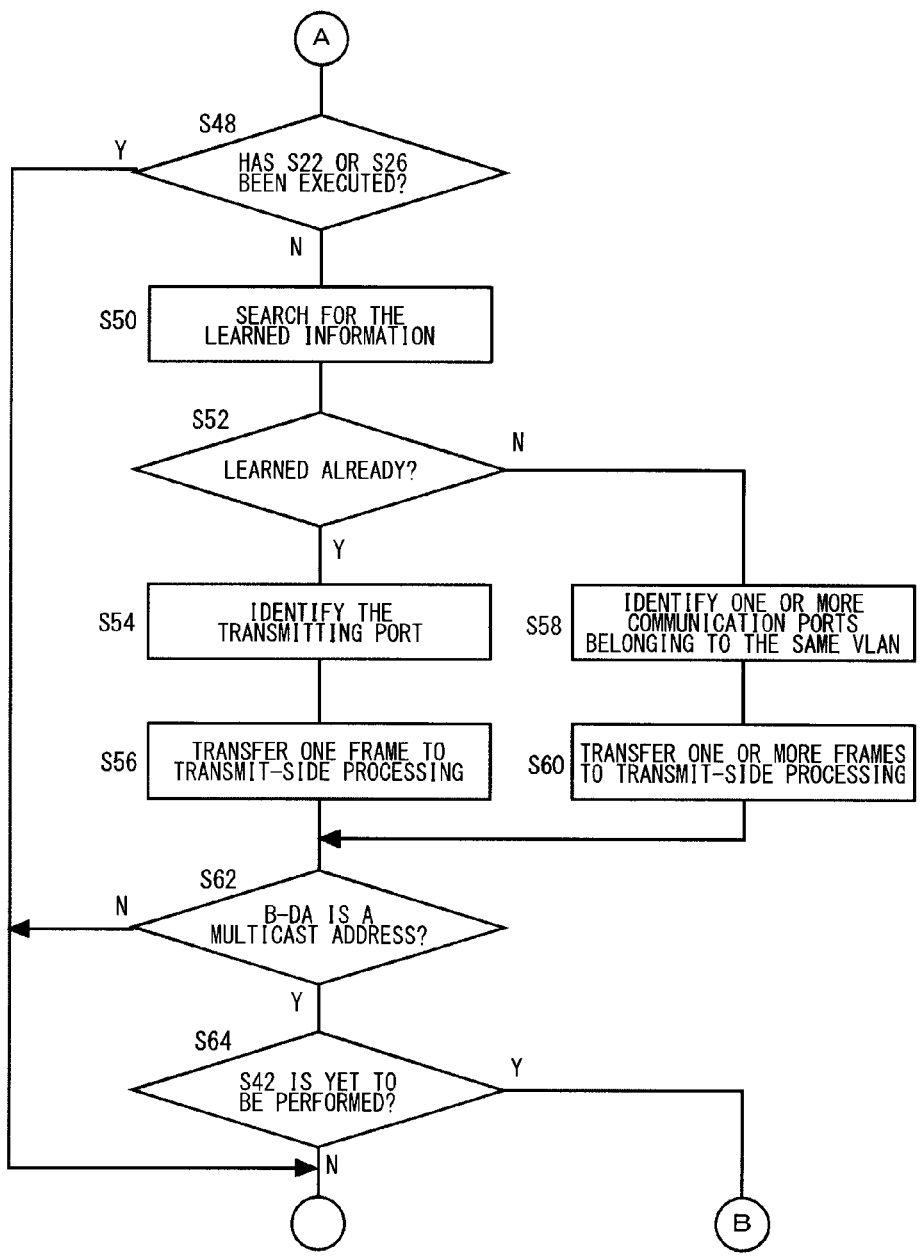
FIG. 9 is a flowchart showing a detailed receiving processing of S12 of FIG. 7.

FIG. 8 and FIG. 9 are flowcharts showing a detailed receiving processing of Step S12 of FIG. 7. FIG. 9 shows processes that continue from FIG. 8. As the L2SW 14 receives a communication frame (original frame) at the port 109, the group of communication ports 42 assign an intra-device frame header as shown in FIG. 5B to the communication frame so as to send it out to the receiving processor 56. The receiving port position of the first frame header is set to "109". The receiving processor 56 determines whether the input source is the group of communication ports 42 or the bus 40, according to an input portion that has received the communication frame. If the input source of the communication frame is the group of communication ports 42 (Y of S20), whether the receiving port is in a forwarding state or not will be identified by referencing a port setting table of FIG. 10A. Tables, including the port attribute table, referenced by the receiving processor 56 are stored in the receiving setting storage 48.

If the receiving port is in a block state (N of S24), the communication frame will be discarded and the flow of FIG. 8 will be terminated (S26). In a first operation case, the port 109 is in a forwarding state (Y of S24). Thus, the attribute of the receiving port is identified by referencing a port attribute table of FIG. 10B and then the identified attribute thereof is set to the first frame header (S28). If the receiving port is on a backbone side, namely if the communication frame is received from the PBB network 30 (Y of S30), the receiving processor 56 will determine whether the communication frame is a control frame (OAM frame) or not, based on the EtherType value of the communication frame. If the communication frame is a control frame (Y of S36), the receiving processor 56 will carry out the processes of Steps S38, S32 and S34.

In the first operation case, the port 109 is not on a backbone side (N of S30). Thus, the receiving processor 56 acquires VLAN-ID (S-VID)=501 to which the communication frame belongs, from the V-LAN tag (S-TAG) of the communication frame (S32). Then the receiving processor 56 learns the receiving port with the VLAN-ID and SA (C-SA) as a key. As a result, the learned information on entry ID "1" in FIG. 4B is set in the learning table 54. To explain the operations in a concise manner, the expression like "the receiving processor 56 updates the learning table 54" is used herein. However, it goes without saying that, in the actual setting, the learned information management unit 52 which has received an instruction from the receiving processor 56 may update the learning table 54 by following its instruction.

Referring to FIG. 9, if Step S22 (CCM setting process) or Step S26 (frame discarding) are carried out (Y of S48), the subsequent processes will be skipped and the flow of FIG. 8 will be terminated. If these Steps have not yet been executed (N of S48), the receiving processor 56 will acquire the VLAN-ID (e.g., S-VID) and DA (e.g., C-DA) from the communication frame and search the learning table 54 with a combination of VLAN-ID and DA as a key (S50). Then, whether the combination thereof has been learned or not is determined. In the first operation case, a learning process has not yet been performed (N of S52). Thus, one or more communication ports belonging to the same VLAN are identified by referencing a port assignment status table in order that the communication frame can be flooded to the communication ports within the same VLAN (S58). In the above-described first operation case, the port 108 and the port 110 on a backbone side, except for the port 109 which is a receiving port of the communication frame to be flooded, are identified as ports to be flooded.

The receiving processor 56 outputs one or more intra-device frames, where one or more communication frames to be flooded are set in the second frame header, respectively, to the transmission processor 58 (S60). If C-DA is a multicast address or broadcast address, the process of searching the learning table 54 may be skipped and the processes subsequent to Step "N of S52" may be executed immediately. As in the first operation case, if B-DA is not specified, or if a unicast address is specified in B-DA (N of S62), the flow of FIG. 9 will be terminated. Processing steps not explained in conjunction with FIG. 8 and FIG. 9 will be discussed later.

Figure 11:
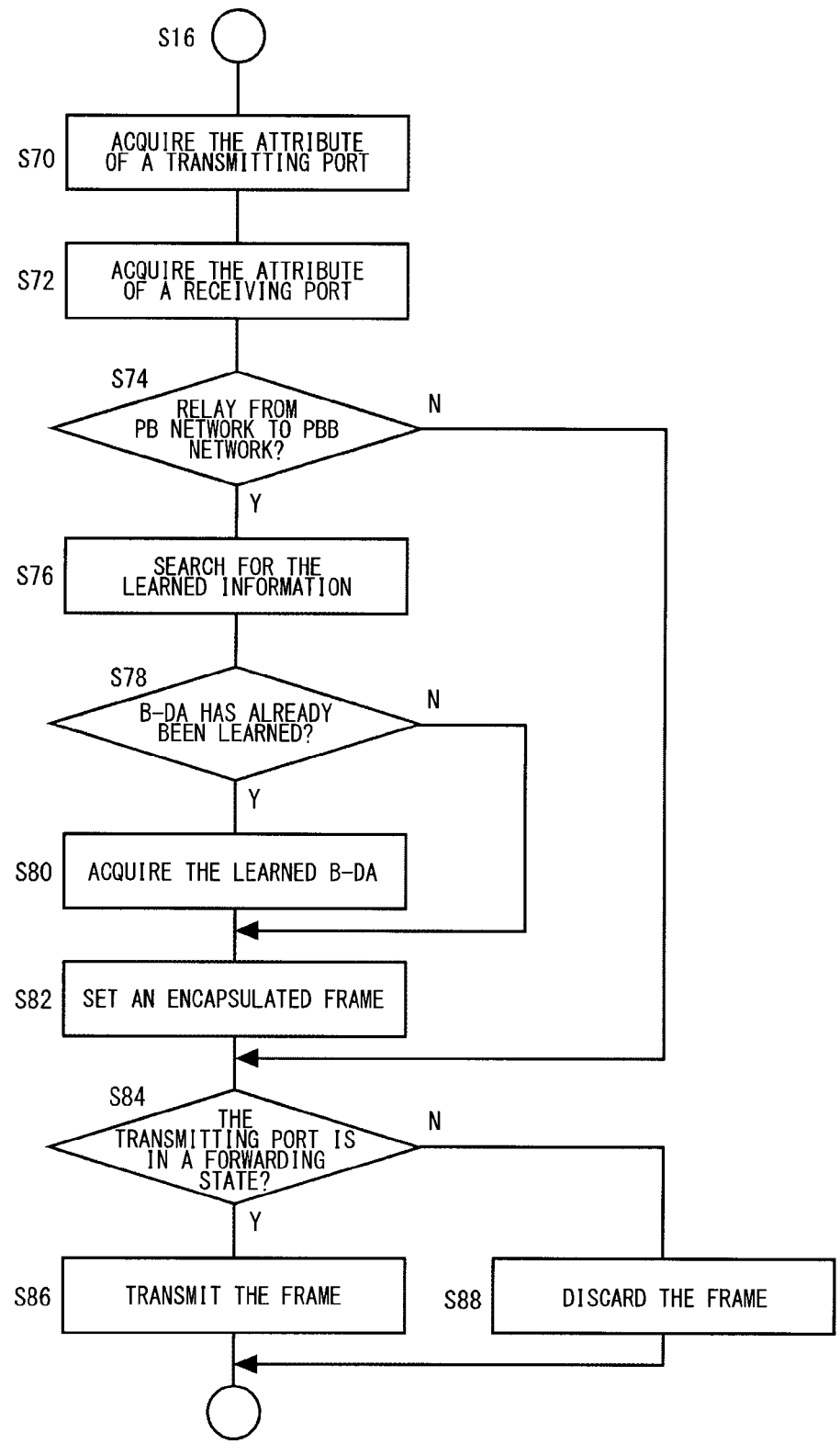
FIG. 11 is a flowchart showing a detailed transmission processing of S14 of FIG. 7.

FIG. 11 is a flowchart showing a detailed transmission processing of Step S14 of FIG. 7. As the transmission processor 58 receives the intra-device frame, the transmission processor 58 identifies the connection attribute of a transmitting port set in the second frame header by referencing a port attribute table of FIG. 12A (S70). Tables, including the port attribute table, referenced by the transmission processor 58 are stored in the transmission setting storage 50. Subsequently, the attribute of a receiving port set in the first frame header of the frame is identified (S72) and it is determined whether a relay is performed from the PB network to the PBB network 30 or not. More specifically, if the receiving port is on an ordinary side and the transmitting port is on a backbone side, it will be determined that the relay is performed from the PB network to the PBB network 30. In the first operation case, the forwarding is done from the port 109 to the port 108 and from the port 109 to the port 110 and therefore the decision result will be a positive one.

For the communication frame through which the relay is done from the PB network to the PBB network 30 (Y of S74), S-VID and C-DA are acquired from this frame and then the learning table 54 is searched (S76). If there is learned information on a combination of S-VID and C-DA in the learning table 54 (Y of S 78), B-DA, namely the MAC address for encapsulation, recorded in the learned information is acquired (S80). Then an encapsulated frame is set using B-DA which has been learned (S82). Since the learning process has not yet been performed in the first operation case (N of S78), Step S80 is skipped and the transmission processor 58 sets an encapsulated frame where a predetermined multicast address to be transferred by flooding to the PBB network 30 is B-DA (S82). Such a multicast address may be a broadcast address where all of 6 bytes are FFs, for instance. Note that if C-DA is a multicast address or broadcast address, the process of searching the learning table 54 may be skipped and the processes subsequent to Step "N of S78" may be executed immediately.

In Step S82, data used to encapsulate the original frame by the MAC-in-MAC scheme is prepared and inserted into a leading position of the encapsulated frame. The value of B-DA which has already been learned or the multicast address is set in B-DA. The MAC address of its own device is set in B-SA. A value corresponding to S-VID is set in B-VID of VLAN tag or I-TAG by referencing a VLAN lookup table. If the frame is not to be relayed from the PB network to the PBB network 30 (N of S74), Steps S76 to 82 will be skipped.

Then, the transmission processor 58 identifies whether the transmitting port position of the second frame header is in a forwarding state or not, by referencing a port setting table of FIG. 12C. In the first operation case, a frame for use in transmission to the port 108 (namely, the encapsulated frame) and a frame for use in transmission to the port 110 are prepared. Since, however, the port 108 is in a block state (N of S84), the frame for use in transmission to the port 108 is not sent out but discarded (S88). On the other hand, since the port 110 is in a forwarding state (Y Of S84), the frame is outputted by sending out the frame for use in transmission to the port 110 to the group of communication ports 42 (S86).

Note that if another port which belongs to VLAN-ID=501 is connected to the PBB network 30 and is also in a forwarding state, the encapsulated frame will be outputted also from such another port.

The encapsulated frame sent out from the port 110 of the L2SW 14 is next received by the port 111 of the L2SW 15. Hereinafter, an operation of the L2SW 15 will be explained with reference to FIG. 8, FIG. 9 and FIG. 11. Note that a part of the operation thereof common to that of the L2SW 14 which has already been described is omitted as appropriate.

Port 111 and port 113 of the L2SW 15 are connected to the PBB network 30 and belong to B-VID=2001. Port 112 is connected to the PB network 34 and belongs to S-VID=501. As the receiving processor 56 receives a communication frame (i.e, an encapsulated frame) from the PBB network 30 (Y of S30), the receiving processor 56 determines if B-DA is the address of its own device because this communication frame is not the control frame (N of S36). Since B-DA of this encapsulated frame is not the MAC address of the L2SW 15 but a multicast address (N of S40), a process of relaying the encapsulated frame, as it is, to the PBB network 30 is performed hereunder.

More specifically, the receiving processor 56 acquires VLAN-ID (B-VID in this case) from B-TAG of the received frame (S32). Then, the receiving port is recorded in the learning table 54 by using the acquired B-VID=2001 and B-SA, which is the MAC address of the L2SW 14, as a key (S34). Moving on to FIG. 9, the communication frame is an encapsulated frame; thus the receiving processor 56 searches the learning table by B-VID=2001 and B-DA of the encapsulated frame (S50). If the learning process has already been performed (Y of S52), a communication port recorded in the port position in the learned information is identified (S54). Then, an intra-device frame for which the identification information on this communication port is set in the transmitting port position of the second frame header is transferred to the transmission processor 58 (S56).

Since the learning process is not performed in the first operation case (N of S52), communication ports belonging to the same VLAN are identified (S58). Besides the receiving port of this communication frame, port 113 also belongs to B-VID=2001 here; thus an intra-device frame for which the port 113 is set in the transmitting port position of the second frame header is transferred to the transmission processor 58 (S60). The transmission processor 58, which has received this intra-device frame, operates according to the processing flow of FIG. 11 and outputs the communication frame, which is still encapsulated, from the port 113.

At this time, B-DA is a multicast address (Y of S62) and Step S42 of FIG. 8 is not executed yet (Y of S64), so that the process of Step S42 starts. In other words, since the multicast address is used to specify the own device, the encapsulated frame is decapsulated. More specifically, the receiving processor 56 acquires S-VID corresponding to I-TAG by referencing a VLAN lookup table shown in FIG. 10D (S42). Then, the receiving port and B-SA are recorded in the learning table with the acquired S-VID=501 and C-SA=c1 as a key (S44). Then, as a decapsulation method, B-DA, B-SA, B-TAG and I-TAG are deleted from the encapsulated frame (S46), thereby restoring the original frame.

Moving on to FIG. 9, the receiving processor 56 searches the learning table by using C-DA as a key (S50). Since the learning process is not performed in the first operation case, a communication port (port 112 in this case) belonging to the VLAN-ID=501 is identified and an intra-device frame for which the port 112 is set in the transmitting port position of the second frame header is transferred to the transmission processor 58 (S60). The transmission processor 58, which has received this intra-device frame, operates according to the processing flow of FIG. 11 and outputs the original frame from the port 112. Though B-DA is a multicast address (Y of S62), the process of Step S42 has been executed (N of S64) and therefore the flow of FIG. 9 is terminated.

The L2SW 11, which has received the encapsulated frame transferred to the PBB 30 by the L2SW 14, also operates similarly to the L2SW 14. Also, the L2SW 12 and the L2SW 13 operate similarly to the L2SW 14. Since the L2SW 12 is a BCB and therefore the decapsulation is not required, the L2SW 12 may be an L2SW incompatible with the MAC-in-MAC scheme. Since the L2SW 13, which outputs the encapsulated frame to port 106, is in a block state, the frame is received by the L2SW 14 and then discarded. As a result, the looping of the communication frame in the ring-structured PBB network 30 is eliminated.

In this manner, for the communication frame that has arrived at the port 109 of the L2SW 14 by way of the L2SW 18 from the customer site C, the learning process for DA thereof is not performed and therefore the frame is transferred by flooding to the communication ports of the same VLAN. Then, the frame is transferred to each PB via port 112 of the L2SW 15, port 101 of the L2SW 11 and port 107 of the L2SW 13 so as to arrive at each customer site.

As a result of the process of relaying frames in the first operation case, the L2SWs, which are placed between nodes and involved in the relaying of the frames, accumulate the learned information. More specifically, in the PBs, VLAN-ID "501", MAC address "c1" and the port position are recorded by associating them with one another. In the PB 30, VLAN-ID "2001", "MAC address of the L2SW 14" and the port position are recorded by associating them with one another. Also, In BEB of the PBB network, VLAN-ID "501", the original MAC address "c1" and MAC address for encapsulation "MAC address of the L2SW 14" are recorded by associating them with one another.

A description is now given of a process of relaying frames using the learning information, as a second operation case. In the second operation case, assume that, similar to the first operation case, the original frame of C-DA=c1 is sent out from the customer site A and a description thereof is given with reference to FIG. 8, FIG. 9 and FIG. 11.

The L2SW 11 receives the original frame relayed through the L2SW 16, at port 101. The L2SW 11 has the learned information of MAC address "c1" at VLAN-ID=501 (Y of S52). Thus, the receiving processor 56 of the L2SW 11 transfers an intra-device frame, for which the port position "port 114" in the learned information is set in the transmitting port position of the second frame header, to the transmission processor 58 (S56).

Since the transmission processor 58 of the L2SW 11 serves as a relay from the PB 31 to the PBB 30 (Y of S74), the transmission processor 58 thereof searches the learning table 54. (S76). The learning process for B-DA for encapsulation has already been performed (Y of S78). Thus, The MAC address of the L2SW 14 is acquired from the learning table 54 as B-DA (S80). As described above, the transmission processor 58 acquires B-VID and I-TAG from the transmission setting storage 50 (S82) and outputs the encapsulated frame from port 114. (S86).

Then, this encapsulated frame is received at port 113 of the L2SW 15. As the receiving processor 56 of the L2SW 15 determines that this frame is not destined for the own device (N of S40), the processes subsequent to Step S32 are executed. Since the learning process for MAC address (B-DA) for encapsulation has already been performed (Y of S52), an intra-device frame, for which the port position "port 111" in the learned information is set in the transmitting port position of the second frame header, is transferred to the transmission processor 58 (S56). The transmission processor 58 sends out the encapsulated frame from port 111.

Then, the L2SW 14 receives this encapsulated frame at port 110. Since B-DA matches the own device, the receiving processor 56 of the L2SW 14 (Y of S40), this encapsulated frame is decapsulated and the original frame is extracted (S46). Then, an intra-device frame, for which the port position "port 109" recorded in the learned information is set in the transmitting port position of the second frame header, is transferred to the transmission processor 58 (S56). The transmission processor 58 sends out the original frame from the port 109.

In this manner, if the learned information is available, the communication frame will be sent out only to the communication port required by each BEB or the BCB so that a process of relaying the frame from the customer site A to the customer site C is performed in the order of L2SW 11→L2SW 15→L2SW 14. Thus, the bandwidth otherwise consumed by the flooding can be prevented from being used. As for the transfer of the frame after the learning process has been performed, the frame is transmitted only on the paths of L2SW 11→L2SW 12→L2SW 13 in the case of a transfer from the customer site A to the customer site B, for instance. In the case of a transfer from the customer site A to the customer site D, the frame is transmitted only on the path of L2SW 11→L2SW 15.

A Description of ETH-OAM

Figure 13:
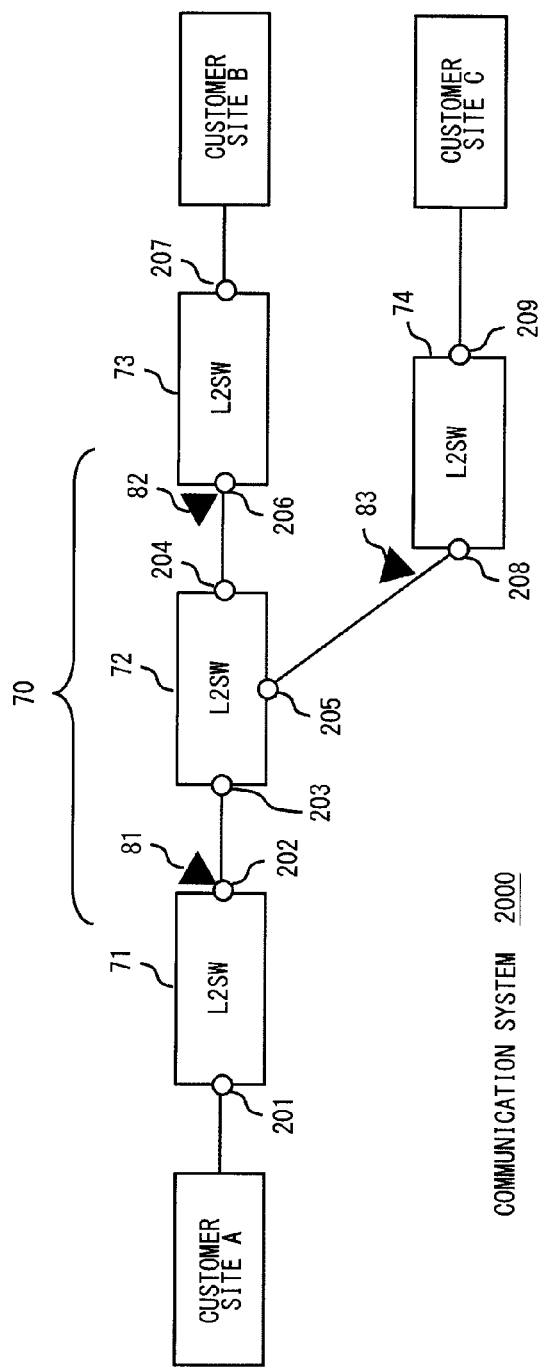
FIG. 13 shows a structure of a communication system uses ETH-OAM.

ETH-OAM is a technique used to maintain and manage the communication networks in the L2VPN service provided by telecommunications carriers. FIG. 13 shows a structure of a communication system uses ETH-OAM. In a communication system 2000, sites A to C of a client X company are connected by L2VPN via a PBB network 70. In the PBB network 70, an encapsulated frame is relayed by four BEBs (L2SW 71 to L2SW 74). It goes without saying that other relay apparatuses may also exist between each BEB.

MEP (Maintenance Entity group end Point) that is a termination point through which a frame for ETH-OAM, namely a CCM frame, is transmitted and received is set in a communication port, on a PBB network 70 side, of communication ports provided in BEBs connected to the customer sites. MEP may also be called a maintenance function point. In the example of FIG. 13, an MEP 81 is set at port 202 of the L2SW 71, an MEP 82 is set at port 206 of the L2SW 73, and an MEP 83 is set at port 208 of the L2SW 74.

A communication port to which MEP is assigned, VLAN and a direction are set in MEP as its attribute. Further, MEP-ID which is unique within the PBB 70, is assigned to each MEP. Though not shown here, a domain in a carrier network is logically partitioned into a plurality of smaller regions, so that a communication frame sent out from a specific customer site does not flow into the other customer sites.

Each MEP of FIG. 11 is set in a direction toward the carrier network. Each MEP sends out a testing communication frame (hereinafter referred to as "ETH-OAM frame" also) toward VLAN that contains the client company X in the carrier network. This test frame does not undergo the MAC-in-MAC encapsulation. If an ETH-OAM frame is one arriving from the direction of MEP itself, MEP will receive this frame. If, on the other hand, it is one arriving from the opposite direction (i.e., from a customer site side), MEP will discard the frame in order not to be mixed in the PBB network 70.

One of ETH-OAM functions is a continuity check test function for checking the normalcy of connection in a given section of the carrier network. Hereinafter, this function will be referred to as "CC function" also. A detailed description is now given of the CC function.

An L2SW, in which MEP is set, sends out periodically a continuity check frame (CCM frame) within the PBB network 70 with MEP as a starting point. The frequency at which the CCM frame is sent out may be once every 100 ms. A multicast address is set in the destination MAC address of CCM frame, whereas a MAC address uniquely indicating a source MEP is set in a source address. The CCM frame includes MEP-ID of MEP that transmits the frame. Since the destination MAC address of CCM is a multicast address, the CCM frame reaches all L2SWs that belong to the same VLAN in the PBB 70.

Whether the CCM frames transmitted from MEPs of other devices connected to the same VLAN are continuously received in a predetermined cycle or not is monitored in a communication port where MEP is set. Thereby, the normalcy of connection status between an own device and the other devices is determined. Since, as described above, MEP-ID is contained in each CCM frame, all of MEP-IDs which are expected to be received (hereinafter referred to as "opposite MEP" also) are registered for each MEP. Then, the normalcy of connection is monitored for each opposite MEP.

For example, in FIG. 13, the MEP 82 set in port 206 of the L2SW 73 and the MEP 83 set in port 208 of the L2SW 74 are registered, as opposite MEPs, relative to the MEP 81 set in port 202 of the L2SW 71. If the L2SW 71 detects that the CCM frame is not detected from at least one of the MEPs, the L2SW 71 will associate MEP-ID of the own MEP with MEP-IDs of the opposite MEPs and convey it to a predetermined maintenance terminal, to the effect, that the network has been disrupted. If the network is restored after the disruption and the CCM can be received again in the predetermined cycle, the restoration of the network will be conveyed to the maintenance terminal. In this manner, the normalcy of communication network can be grasped for each given section.

Description of Erasure of Learned Information in Conventional Technique

A description is given of a case, as an example, where a failure occurs in a transmission path between the L2SW 15 and the L2SW 14 in the network similar to that of FIG. 1. In such a case, the communication within the PBB network 30 continues and thus a block point must be updated and the learned information must be erased. More specifically, now that the above failure occurs, the following processings are carried out. That is, port 108 of the L2SW 14 is changed to a forwarding state, and all learned information within the PBB network 30 is erased. These processings may be manually done by maintenance personnel operating the maintenance terminal or may be automatically done using a predetermined protocol function such as STP.

As the learned information in each L2SW is erased, the communication frame is transferred by flooding before the learned information is accumulated again. With this transfer by flooding, the communication frame can be transmitted from the customer site A to the customer site C through a new path of L2SW 11→L2SW 12→L2SW 13=L2SW 14.

In the case where a failure occurs in a transmission path between the L2SW 15 and the L2SW 14, the transmission path of the frame transferred from the customer site A to the customer site B and the transmission path of the frame from the customer site A to the customer site D are not changed. Thus, it is safely concluded that the learned information on the frame dispatched from the customer site A and destined for the customer site B or D needs not to be erased.

However, all learned information is erased uniformly in the conventional technique. Thus, the frame dispatched from the customer site A and destined for the customer site B or D is also transferred by flooding. For example, because of the above failure, frames which are destined for the customer site D but have not yet been sent out are now sent out. This flooding continues until the correspondence between addresses and ports is relearned through the transfer by flooding on a new path. Flooding occurs in all of the L2SWs included in the PBB network 30. Hence, superfluous frames flow into the PBB network 30 and thereby compress the bandwidth; if they are congested exceeding the bandwidth of the transmission path, some of the frames may possibly be discarded.

Detailed Description of Preferred Embodiments

First Embodiment

As already described, what to be learned by each of the L2SWs (L2SWs 16 to 19) installed in the PB networks of FIG. 1 are the MAC address of the customer's communication device, its own transfer port corresponding thereto, and the S-VID, to the exclusion of information concerning the transfer path of communication frames. Hence, it is difficult to identify learned information to be erased at the L2SWs 16 to 19.

On the other hand, in the PBB network 30 of FIG. 1, communication frames are encapsulated by the MAC-in-MAC scheme, and the encapsulated frames, including the MAC addresses of the BEBs intervening to relay the communication frames, are transmitted. In a first embodiment of the present invention, therefore, the MAC addresses of the BEBs are also used by the CCM frame, and a decision whether to erase learned information or not is made using the result of monitoring by the CC function. Thus, a selective erasure of learned information, that is, a limitation of the extent of erasure of learned information, is realized.

It is to be noted that when the conventionally known CC function is used in monitoring the normalcy of the communication paths between the L2SWs within the PBB network 30, it is possible to monitor the normalcy of connection between any given L2SWs by setting an MEP at every communication port connected to the PBB network 30. However, in the case where the PBB network 30 has redundant paths and thus the transfer path of communication frames can change, it may sometimes be difficult for the system with an MEP set at every communication port to respond to the change in communication path at the occurrence of malfunction. As a result, there may be cases where the CC function cannot be kept on.

For example, the connection status between L2SW 11 and L2SW 13 of FIG. 1 can be monitored by setting an MEP at both port 102 of the L2SW 11 and port 105 of the L2SW 13 and allowing transmission and receiving of CCM frames between the MEPs. Yet, if a malfunction occurs at the L2SW 12, port 108 of the L2SW 14 will be set to a forwarding state, thereby restoring the connection between the L2SW 11 and the L2SW 13. Even in such a case, however, it will no longer be possible to monitor the connection status between the two devices by the above-mentioned MEPs. Now to restart the monitoring of the connection status, it is necessary to newly set an MEP at each of port 114 of the L2SW 11 and the port 106 of the L2SW 13. Also, to realize such a maneuver, the maintenance personnel must take the trouble of shifting the position of the MEP at each L2SW.

In the first embodiment, therefore, an OAM function point (MEP for terminating CCM), which is set for the BEB to monitor an end-to-end connection status within the PBB network 30, is provided as a single function point for each device, not as a single function point for each communication port. In other words, a BEB has a single MEP, by which the CCM frames received by its plurality of communication ports are terminated collectively.

For example, the MEP of the L2SW 14 is placed between a communication port on the side of the PBB network 30 and a functional block for encapsulation/decapsulation of communication frames, in the direction of the PBB network 30 for each B-VLAN. This MEP handles OAM frames, which are not encapsulated by MAC-in-MAC, as CCM frames. Also, the CCM frames, when they are to be sent out toward the PBB network 30, is sent out collectively to one or more communication ports belonging to the same B-VLAN. Also, when incoming CCM frames are received from the PBB network 30, they are received collectively whichever the communication ports that receive them are, so long as the communication ports belong to the same B-VLAN.

In this manner, continuous monitoring by the same MEPs is realized irrespective of the position of the block point, that is, even when the relay status of the communication ports changes. For example, the MEP set in the L2SW 11 outputs a CCM frame to both port 102 and port 113 when it is to be sent out with the passage of a predetermined period of time. Also, the CCM frame received by port 102 and the CCM frame received by port 113 are both processed by the same MEP. It is assumed herein that the source MAC address of the CCM frame is the MAC address of the source L2SW, and it is also assume herein that the destination MAC address thereof is the multicast address.

Figure 14:
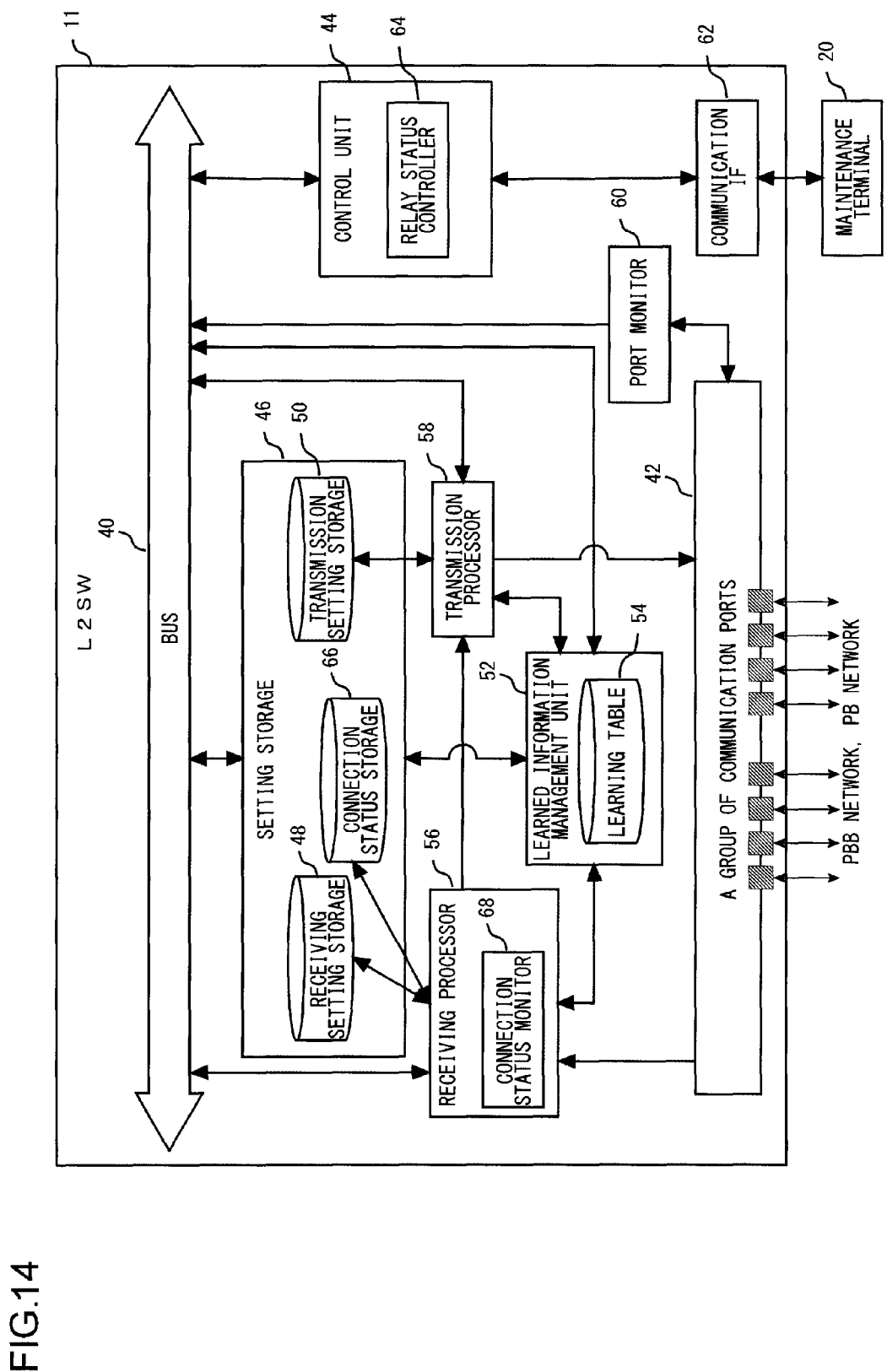
FIG. 14 is a block diagram showing a functional configuration of an L2SW according to a first embodiment of the present invention.

A system structure of the first embodiment is similar to that of the communication system 1000 of FIG. 1. FIG. 14 is a block diagram showing a functional configuration of an L2SW of the first embodiment. Note that the functional configuration of the L2SW is the same for the second to fourth embodiments to be discussed later. Also, the parts of description of the configuration of the L2SW which have already been given with reference to FIG. 3 will be omitted as appropriate. Also, the parts of description of the operation of the L2SW which have already been given with reference to FIGS. 8, 9, and 11 will be omitted as appropriate.

As shown in FIG. 14, the L2SW in the first embodiment differs in configuration from the L2SW of FIG. 3 in that the setting storage 46 further includes a connection status storage 66 and the receiving processor 56 includes a connection status monitor 68. The connection status storage 66 stores information about the connection status in relation to the other L2SWs, that is, the results of the continuity check, in a CC result table. The connection status monitor 68 realizes the MEP for each device which collectively provides the above-described MEP function, namely, the CC function for a plurality of communication ports and updates the data stored in the CC result table successively according to the results of CC.

Figures 15, 16:
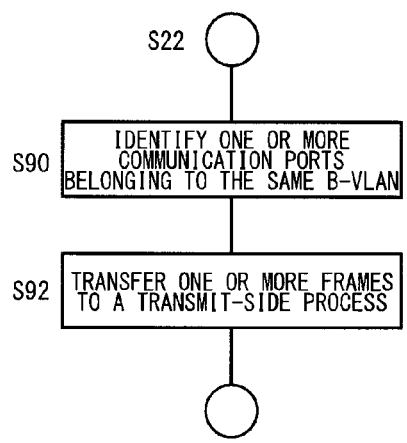
FIG. 15 shows a structure of a CC result table.
FIG. 16 is a flowchart showing a detailed CCM setting processing of S22 of FIG. 8.

FIG. 15 shows a structure of a CC result table. FIG. 15 shows a CC result table held by the L2SW 11. Stored in an "MEP-ID" column are the IDs of opposite MEPs which the L2SW 11 expects to receive. Stored in a "MAC Address" column are the MAC addresses of the source devices sending CCM frames, namely, the devices having the opposite MEPs. These MAC addresses are the same as those set in B-SA of the encapsulated frames. Stored in a "Receiving Port Position" column are the identification information about the receiving ports of CCM frames. The connection status storage 66 sets the receiving port positions of CCM frames set in the first frame header, in this column of the CC result table.

Stored in a "Receiving Status" column is information indicating whether the status of connection with an opposite MEP is normal or abnormal. More specifically, "Normal" is set in the "Receiving Status" column if the CCM frame from an opposite MEP is received periodically, whereas "Abnormal" is set if a cycle at which the CCM must be received (e.g., 100 milliseconds) elapses three times or more (three cycles or more) without receiving the CCM. Stored in a "Non-receiving Period" column are periods during which the CCM frame has not been received. When the connection status monitor 68 receives the CCM frame, the connection status monitor 68 enters "0" in the "Non-receiving Period" column. Every time the receiving cycle (100 milliseconds) elapses, the connection status monitor 68 adds this value to the non-receiving period. If the non-receiving period reaches 300 milliseconds as a result of this addition, the connection status monitor 68 will change the value of the Non-receiving Period column from "Normal" to "Abnormal"

A description is now given of an operation at the time the CCM frame is transmitted. As the control unit 44 of the L2SW detects the passage of a predetermined period of time (100 milliseconds), the control unit 44 conveys an instruction to send out the CCM frame, to the receiving processor 56. This transmission instruction may be conveyed for each B-VLAN or B-VID may be specified individually. Referring to FIG. 8, when the receiving processor 56 receives via the bus 40 the instruction to send out the CCM frame (N of S20), the receiving processor 56 executes the CCM setting processing (S22).

FIG. 16 is a flowchart showing a detailed CCM setting processing of Step S22 of FIG. 8. Since the destination MAC address of the CCM frame is a multicast address, the L2SW floods the CCM frame to the communication ports belonging to the same B-VLAN. Accordingly, the connection status monitor 68 of the receiving processor 56 identifies one or more communication ports belonging to the same B-VLAN by referencing the port assignment status table similar to that of FIG. 10C (S90). The connection status monitor 68 sends out one or more intra-device frames for which one or more communication ports to be flooded, respectively, are set in the second frame header, to the transmission processor 58 (S92). Note here that the frame data of such one or more intra-device frames is the CCM of FIG. 6. Thereby, the transmission processor 58 sends out the CCM frame periodically for each B-VLAN.

The CCM frame arrives at all of L2SWs belonging to the same B-VLAN in the PBB network 30. Thus, the MEPs of the respective L2SWs receives the CCM from all of the opposite MEPs. A description is now given of an operation at the time the CCM is received. Referring to FIG. 8, as the receiving processor 56 receives the CCM frame via the group of communication ports 42 (Y of S36), the receiving processor 56 executes the CCM receiving processing (S38).

Figures 17, 18:
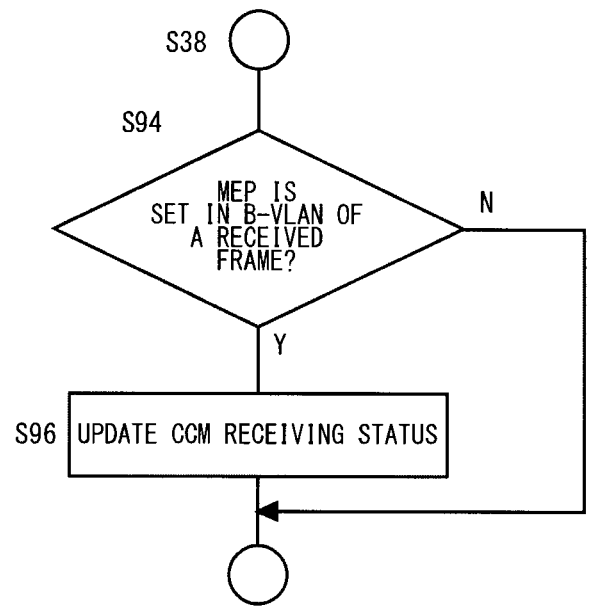
FIG. 17 is a flowchart showing a detailed CCM receiving processing of S38 of FIG. 8.
FIG. 18 shows a structure of an MEP setting table.

FIG. 17 is a flowchart showing a detailed CCM receiving processing of Step S38 of FIG. 8. The connection status monitor 68 references the MEP setting table of FIG. 18 and determines whether or not the MEP of the own device is associated with B-VLAN specified by the CCM frame. If the MEP associated with the B-VLAN specified by the CCM frame has already been set (Y of S94), the entry of the CC result table corresponding to the MEP-ID specified by the CCM frame will be updated (S96). If the MEP associated with the B-VLAN specified by the CCM frame is not set (N of S94), Step S96 will be skipped.

The updating of the receiving status of CCM is now explained. As shown in the CCM result table of FIG. 15, the IDs of opposite MEPs that the L2SW expects to receive are first registered to manage the CCM receiving status, and the normalcy of connection is monitored for each of the opposite MEPs. When it is detected that the CCM frame is not received as expected (typically when it is detected that the non-receiving period becomes longer than or equal to a malfunction detection period), the receiving status column of the CC result table is updated from "Normal" to "Abnormal". The control unit 44 monitors the receiving status column of the CC result table; if there is a change in the value of the receiving status column, the control unit 44 will convey the change together with its MEP-ID to the maintenance terminal 20. The occurrence of any interruption in a transmission path in the PBB network 30 between any given MEPs can be informed to the maintenance personnel.

Figure 19:
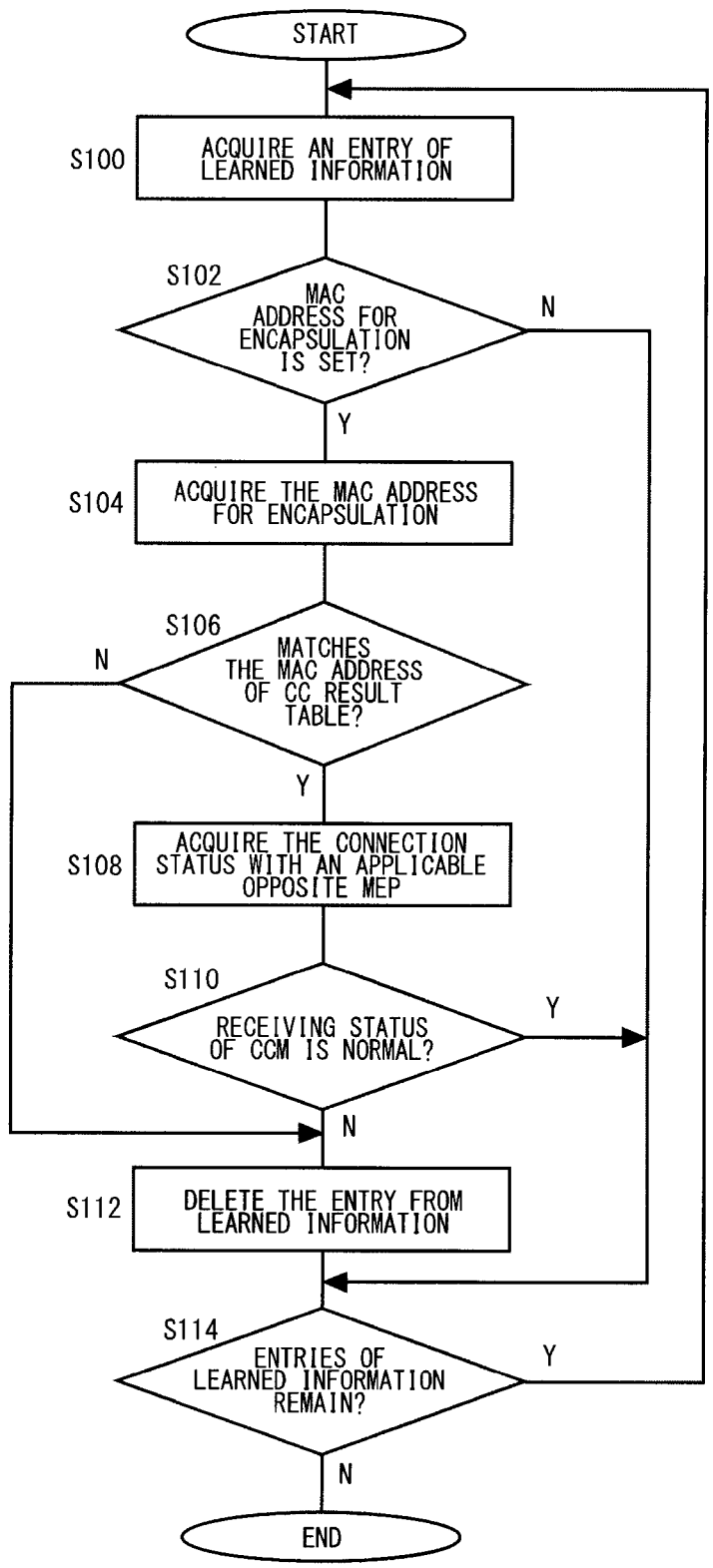
FIG. 19 is a flowchart showing an operation of a learned information update processing in an L2SW.

A description is now given of an operation of deleting the learned information when the block point changes, namely when the transmission path of the communication frame changes. FIG. 19 is a flowchart showing an operation of a learned information update processing in the L2SW.

Assume herein that a malfunction occurs in a communication path between the L2SW 15 and the L2SW 14 on the PB 30 in FIG. 1. In this case, a block point provided in the port 108 of the L2SW 14 is open. In other words, the port 108 of the L2SW 14 is changed from a block state to a forwarding state. Such a change in the relay status of the communication port, namely the change in the transmission path of the communication frame, may be made by the relay status controller 64 which has received an instruction via the maintenance terminal 20 from the maintenance personnel. Also, the relay status controller 64 may detect a change in the setting status of the block point by transmitting and receiving a STP message to and from other L2SWs.

If the relay status controller 64 detects a change in the setting status of the block point on the PBB network 30, the relay status controller 64 will notify the learned information management unit 52 accordingly. As the change in the setting status of the block point is conveyed to the learned information management unit 52, the learned information management unit 52 acquires an entry of the learned information from the learning table 54, as a deletion candidate entry (S100). If a MAC address for encapsulation is recorded in said entry (Y of S102), the learned information management unit 52 will acquire the MAC address for encapsulation (S104). Then, the learned information management unit 52 determines, by searching the CC result table of the connection status storage 66, whether there is an opposite MEP that matches the MAC address for encapsulation or not. If there is the opposite MEP that matches the MAC address for encapsulation (Y of S106), the learned information management unit 52 will acquire the receiving status of the CCM frame fed from the opposite MEP (S108).

If the receiving status is abnormal (N of S110), the deletion candidate entry will be deleted from the learning table 54 (S112). If the receiving status is normal (Y of S110), Step S112 will be skipped. If the entries of the learning information remain (Y of S114), the procedure will return to Step S100. If no entry remains (N of S114), the process of updating the learned information will be terminated. If the MAC address for encapsulation is not set in the deletion candidate entry (N of S102), Steps S104 to S112 will be skipped (because such entry is not the learned information on the transmission in the PBB network 30) and the next entry will be examined. If the opposite MEP that matches the MAC address for encapsulation is not set (N of S106), Steps S108 and S110 will be skipped and the deletion candidate entry will be deleted. This is because it is the learned information other than that to be monitored by CC and therefore the connection status is unclear and also because a transfer by flooding is desirable to improve the certainty of the transmission of the communication frame.

By employing the first embodiment, even though the setting status of the block point in the PBB network 30 varies, the learned information destined for an opposite device is excluded from information to be deleted if this opposite device continues to receive the CCM frame, so that the occurrence of flooding can be reduced.

Also, a single MEP is set for each L2SW. Thus, even though the receiving port of the CCM frame is changed as a result of a change in the communication path within the PBB network 30, the continuity check can be continued without setting a new MEP. Hence, the connectivity can be monitored continuously, thereby reducing the burden imposed on the maintenance personnel. In particular, the present embodiment is suitable for the L2SW where the learned information is deleted based on whether the CCM frame is continuously received or not.

Second Embodiment

In a second embodiment, the learned information is deleted not as a result of the instruction given from the maintenance personnel or the protocol processing in the path switching of STP and the like. Instead, the learned information is deleted when the receiving status of CCM becomes abnormal, namely, when the abnormality in the connection status is detected by a CCM function. In this manner, the difference between the first embodiment and the second embodiment lies in the updating instant of learned information. Thus, the features and operations of the second embodiment other than this difference are similar to the first embodiment, and the second embodiment achieves the same advantageous effects as those of the first embodiment. A description is given hereunder of an operation of the process for updating the learned information.

Figure 20:
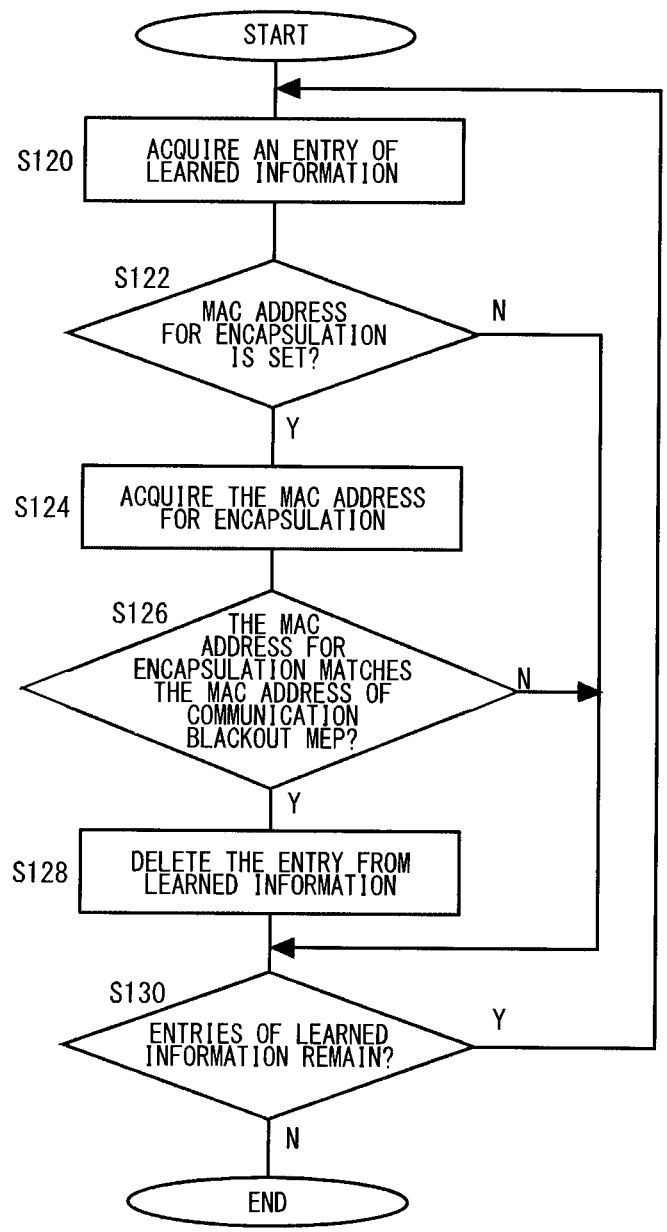
FIG. 20 is a flowchart showing an operation of a learned information update processing in an L2SW.

FIG. 20 is a flowchart showing an operation of a learned information update processing in an L2SW. The connection status monitor 68, which has determined that the receiving status of the CCM frame is abnormal, sends a notification regarding this fact to the learned information management unit 52. In order to reference the information on an opposite MEP (which is determined to be abnormal) recorded in the CC result table, this notification contains the ID of the opposite MEP determined to be abnormal. Upon receipt of this notification indicating the abnormality of the receiving status of the CCM frame, the learned information management unit 52 acquires an entry of the learned information from the learning table 54 as a deletion candidate entry (S120). If a MAC address for encapsulation is recorded in said entry (Y of S122), the learned information management unit 52 will acquire the MAC address for encapsulation (S124).

The learned information management unit 52 determines if the MAC address of the opposite MEP determined to be abnormal matches the MAC address for encapsulation in the deletion candidate entry. If the MAC address of the opposite MEP determined to be abnormal matches the MAC address for encapsulation in the deletion candidate entry (Y of S126), the deletion candidate entry will be deleted from the learning table 54 (S128). If the MAC address of the opposite MEP determined to be abnormal does not match the MAC address for encapsulation in the deletion candidate entry, Step S128 will be skipped. If the entries of the learning information remain (Y of S130), the procedure will return to Step S120. If no entry remains (N of S130), the process of updating the learned information will be terminated. If the MAC address for encapsulation is not set in the deletion candidate entry (N of S122), Steps S124 to S128 will be skipped (because such entry is not the learned information on the transmission in the PBB network 30) and the next entry will be examined.

Third Embodiment

If the transmission cycle of the CCM frame is longer, there may be cases where the CCM frame transmitted through a new communication path is received at a receiving port different from the previously used port so far, before the abnormality of the receiving status of the CCM frame is detected. In such a case, the inventor recognizes that the occurrence of flooding can be further reduced efficiently if the port position of the learned information is rewritten by the new receiving port without having to wait for the detection of the abnormality of the receiving status of the CCM frame.

Differences between the first embodiment and the third embodiment lies in the updating instant and method of learned information. Thus, the features and operations of the third embodiment other than this difference are similar to the first embodiment, and the third embodiment achieves the same advantageous effects as those of the first embodiment. A description is given hereunder of an operation of the process for updating the learned information.

Figure 21:
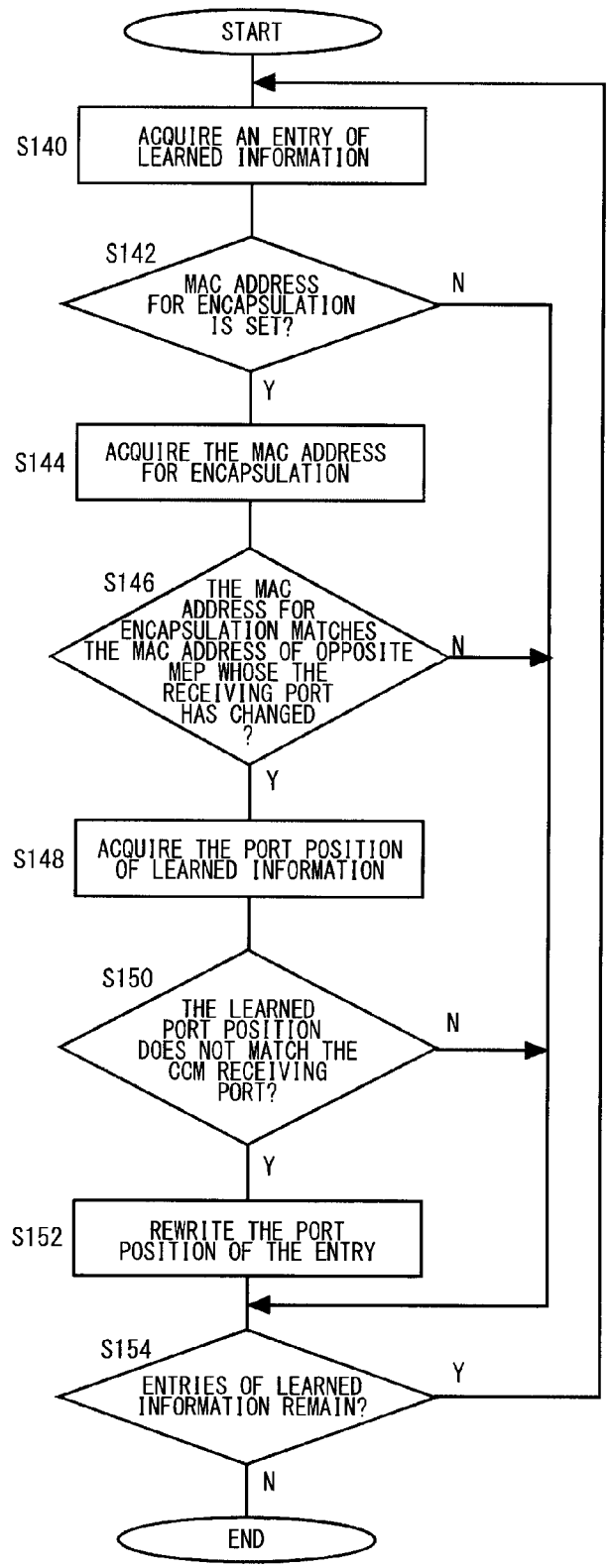
FIG. 21 is a flowchart showing an operation of a learned information update processing in an L2SW.

FIG. 21 is a flowchart showing an operation of a learned information update processing in an L2SW. At the instant the connection status monitor 68 receives a CCM frame, the connection status monitor 68 determines whether or not the receiving port position set beforehand in the CC result table matches the receiving port position set in the first frame header of the received CCM frame. If these receiving port positions do not match with each other, the connection status monitor 68 will change the previous receiving port position to the receiving port of said CCM frame in the "Receiving Port Position" column of the CC result table, and send a notification indicating that the received port position has been changed, to the learned information management unit 52. In order to reference the information on an opposite MEP (which corresponds to said CCM frame) recorded in the CC result table, this notification contains the ID of the opposite MEP.

Upon receipt of this notification indicating that the received port position has been changed, the learned information management unit 52 acquires an entry of the learned information from the learning table 54 as a rewrite candidate entry (S140). If a MAC address for encapsulation is recorded in said entry (Y of S142), the learned information management unit 52 will acquire the MAC address for encapsulation (S144).

The learned information management unit 52 determines if the MAC address of the opposite MEP whose receiving port has been changed matches the MAC address for encapsulation in the rewrite candidate entry. If the MAC address of the opposite MEP whose receiving port has been changed matches the MAC address for encapsulation in the rewrite candidate entry (Y of S146), the receiving port position recorded in the rewrite candidate entry (S148). The learned information management unit 52 determines if the receiving port position in the rewrite candidate entry matches the receiving port position of the opposite MEP corresponding to the CCM frame whose receiving port has been changed. If the receiving port position in the rewrite candidate entry does not match the receiving port position of the opposite MEP corresponding to the CCM frame whose receiving port has been changed (Y of S150), the learned information management unit 52 will change the receiving port position of the rewrite candidate entry in the learning table 54, to the receiving port position of the opposite MEP (i.e., the receiving port position of the CCM frame after the change) (S152). If the receiving port position in the rewrite candidate entry matches the receiving port position of the opposite MEP corresponding to the CCM frame whose receiving port has been changed (N of S150), Step S152 will be skipped.

If the entries of the learning information remain (Y of S154), the procedure will return to Step S140. If no entry remains (N of S154), the process of updating the learned information will be terminated. If the MAC address for encapsulation is not set in the rewrite candidate entry (N of S142), Steps S144 to S152 will be skipped (because such entry is not the learned information on the transmission in the PBB network 30) and the next entry will be examined. Similarly, if the MAC address of the opposite MEP whose receiving port has been changed does not match the MAC address for encapsulation in the rewrite candidate entry (N of S146), Steps S148 to S152 will be skipped and the next entry will be examined.

By employing the third embodiment, the receiving port position is rewritten instantaneously keeping track of the change in the receiving port of the CCM frame without having to delete the learned information affected by the change of the transmission path in the PBB network 30. Hence, the relearning through a transfer by flooding is no longer required, so that the occurrence of flooding can be further reduced.

Fourth Embodiment

Any arbitrary combination among the above-described first to third embodiments prove useful as another and further embodiment of the present invention. New embodiments arising from a combination thereamong also enjoy the advantageous effects of their respective embodiments combined. In a fourth embodiment, an example of further embodiments arising from such combinations among the first to third embodiment is described.

Figure 22:
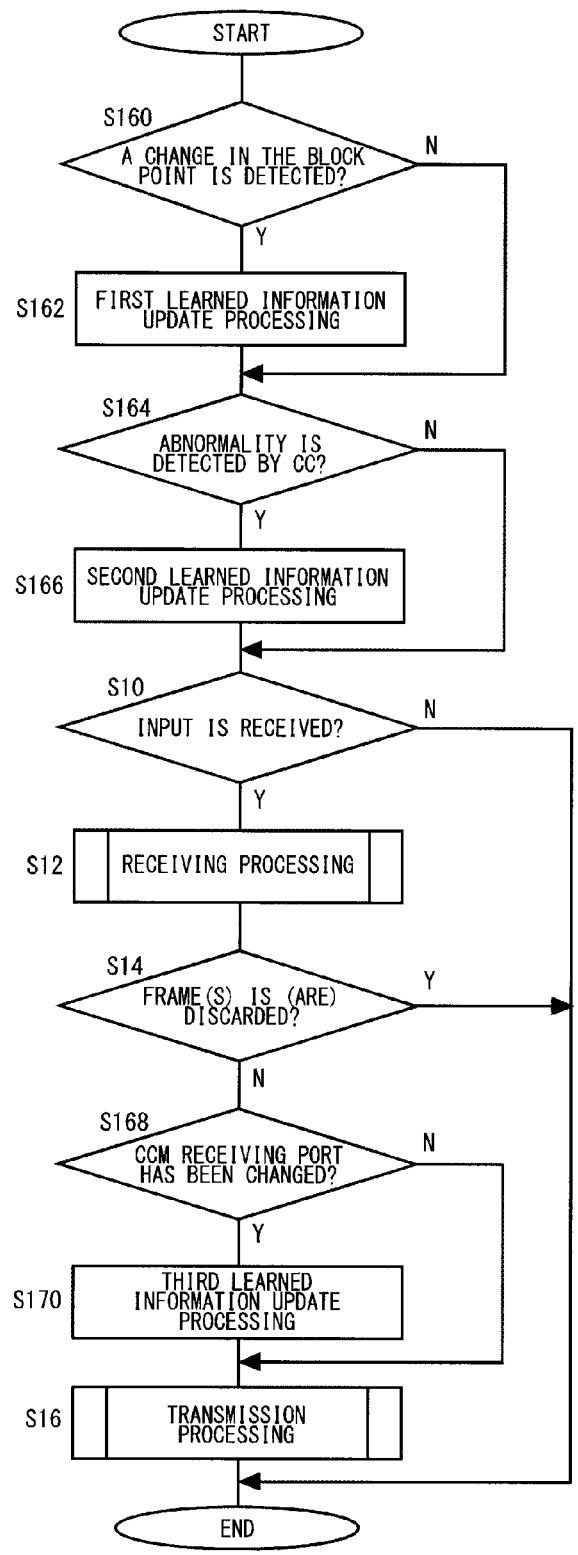
FIG. 22 is a flowchart showing an operation of an L2SW.

The structures of the communication system and each L2SW according to the fourth embodiment are similar to those of the first embodiment. FIG. 22 is a flowchart showing an operation of an L2SW. As the control unit 44 detects that the setting status of the block point has been changed (Y of S160), the learned information management unit 52 performs a first learned information update processing (S162). The first learned information update processing is the learned information update processing described in the first embodiment and is executed according to the processing flow of FIG. 19. If the setting status of the block point is not detected (N of S160), Step S160 will be skipped.

As the connection status monitor 68 detects the occurrence of a malfunction through the continuity check by transmitting and receiving the CCM frame (Y of S164), the learned information management unit 52 performs a second learned information update processing (S166). The second learned information update processing is the learned information update processing described in the second embodiment and is executed according to the processing flow of FIG. 20. If the setting status of the block point is not detected (N of S160), Step S160 will be skipped. If the result of continuity check indicates "normal" (N of S164), Step S166 will be skipped.

The subsequent steps of S10, S12, S14 and S16 have already been described in conjunction with FIG. 7 and therefore the repeated description thereof is omitted here. If it is detected, through the receiving processing, that the CCM frame has been received at a communication port different from the previously used port so far (Y of S168), the learned information management unit 52 will perform a third learned information update processing (S170). The third learned information update processing is the learned information update processing described in the third embodiment and is executed according to the processing flow of FIG. 21. If there is no change in the receiving port of the CCM (N of S168), Step S170 will be skipped.

By employing the fourth embodiment, the L2SW achieving the advantageous effects of the first to third embodiments, respectively, can be realized. In other words, the L2SW according to the fourth embodiment can minimize the occurrence of flooding to reconfigure the learned information can be minimized in the event that a change occurs in a communication environment in the PBB network 30.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

It is also understood by those skilled in the art that the functions to be performed by constituent features cited in the Claims may be achieved by single components alone in the components shown in the embodiments and modifications or in combination thereof.

What is claimed is:

1. A relay apparatus for relaying communication frames, the relay apparatus comprising:
    a plurality of communication ports;
    a frame transmitter configured to transmit an encapsulated frame to a network, the encapsulated frame being generated such that a communication frame received from outside is encapsulated by data containing an address of the relay apparatus, wherein, before encapsulation, the communication frame includes a source address and a destination address;
    a learned information management unit configured to record learned information that associates a receiving port, an address of another relay apparatus, and a source address specified in another communication frame before encapsulation when said another communication frame, which is encapsulated by data containing the address of the another relay apparatus, is received from the network; and
    a status monitoring unit configured to check a connection status for the another relay apparatus,
    wherein said relay apparatus and the network are redundantly connected by a plurality of communication paths to which the plurality of communication ports are connected,
    wherein, when the destination address specified in the communication frame before encapsulation matches a source address indicated by a specific record of the learned information, the frame transmitter transmits the encapsulated frame to the network via one of the plurality of communication paths without flooding the plurality of communication ports by transmitting the encapsulated frame to the network from the receiving port indicated by said specific record, the address of the another relay apparatus being indicated by the specific record being designated in the encapsulated frame, and
    wherein, when the learned information management unit detects a change in a frame transmission path in the network, the learned information management unit deletes a record of the learned information associated with the address of the another relay apparatus when a result of checking the connection status indicates abnormality of connection, but does not delete the record of the learned information associated with the another relay apparatus when the result of checking the connection status indicates normalcy of connection.

2. A relay apparatus, for relaying communication frames, according to claim 1, wherein said relay apparatus and the another relay apparatus are redundantly connected to each other by a plurality of communication paths,
    wherein a block point to interrupt the relay of the communication frames is provided in at least one of the plurality of communication paths, and
    wherein when setting status of the block point varies, the learned information management unit selectively deletes the learned information in accordance with the check result of the connection status.

3. A relay apparatus, for relaying communication frames, according to claim 1, wherein the status monitoring unit receives a frame used to check connection status, from the another relay apparatus, and wherein when the receiving port of the frame used to check connection status does not match the receiving port in the learned information associated with the another relay apparatus, the learned information management unit rewrites the receiving port in the learned information by the receiving port of the frame used to check connection status.

4. A relay apparatus, for relaying communication frames, according to claim 1, wherein said relay apparatus and the another relay apparatus are redundantly connected to each other by a plurality of communication paths, wherein the status monitoring unit sets a single termination point to terminate connection status checking frames collectively, regardless of which communication port has received the frame, and the status monitoring unit continues to receive the connection status checking frame at the single termination point regardless of a change in the receiving ports.

5. A relay method executed by a relay apparatus having a plurality of communication ports, the relay method comprising:

transmitting an encapsulated frame to a network, the encapsulated frame being generated such that a communication frame received from outside is encapsulated by data containing an address of the relay apparatus wherein, before encapsulation, the communication frame includes a source address and a destination address;

recording learned information that associates a receiving port, an address of another relay apparatus, and a source address specified in another communication frame before encapsulation when said another communication frame, which is encapsulated by data containing the address of the another relay apparatus, is received from the network;

checking connection status for the another relay apparatus;

wherein said relay apparatus and the network are redundantly connected by a plurality of communication paths to which the plurality of communication ports are connected, wherein, when the destination address specified in the communication frame matches a source address indicated by a specific record of the learned information, said transmitting transmits the encapsulated frame of the communication frame to the network via one of the plurality of communication paths without flooding the plurality of communication ports by transmitting the encapsulated frame to the network from the receiving port being indicated by said specific record, the address of the another relay apparatus indicated by the specific record being designated in the encapsulated frame; and when said recording detects a change in a frame transmission path in the network, deleting a record of the learned information associated with the address of the another relay apparatus when a result of checking the connection status indicates abnormality of connection, and not deleting a record of the learned information associated with the another relay apparatus when the result of checking the connection status indicates normalcy of connection.

* * * * *